US012696845B2

(12) United States Patent
Wegmann et al.

(10) Patent No.: US 12,696,845 B2
(45) Date of Patent: Aug. 4, 2026

(54) GRAIN CART-SPECIFIC CONTROL SYSTEM FOR AUTOMATED GRAIN CART UNLOADING

(71) Applicant: Deere & Company, Moline, IL (US)

(72) Inventors: Riley J. Wegmann, Urbana, IA (US); William J. Vande Haar, Janesville, IA (US); Eduardo Arvizu Rivera, General Escobedo (MX); Daniel M. Solano, Monterrey (MX); Jose M. Salazar Munoz, Monterrey (MX); Edson E. Castañeda Mancillas, Monterrey (MX); Héctor E. Sanjuan Garcia, Monterrey (MX)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 18/593,439

(22) Filed: Mar. 1, 2024

(65) Prior Publication Data

US 2025/0275503 A1     Sep. 4, 2025

(51) Int. Cl.
*A01D 90/10*     (2006.01)
*A01B 69/00*     (2006.01)

(52) U.S. Cl.
CPC ............ *A01D 90/10* (2013.01); *A01B 69/004* (2013.01)

(58) Field of Classification Search
None
See application file for complete search history.

(56) References Cited

U.S. PATENT DOCUMENTS

| | | | |
|---|---|---|---|
| 8,032,255 | B2 | 10/2011 | Phelan et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,755,976 | B2 | 6/2014 | Peters et al. |
| 8,868,304 | B2 | 10/2014 | Bonefas |
| 9,043,096 | B2 | 5/2015 | Zielke et al. |
| 9,049,817 | B2 | 6/2015 | McCully et al. |
| 9,119,342 | B2 | 9/2015 | Bonefas |
| 9,169,032 | B2 | 10/2015 | Gengerke |
| 9,185,845 | B2 | 11/2015 | Van Mill et al. |

(Continued)

FOREIGN PATENT DOCUMENTS

| | | |
|---|---|---|
| CA | 2791436 A1 | 4/2014 |
| DE | 10064862 A1 | 7/2002 |

(Continued)

OTHER PUBLICATIONS

Tumenjargal et al., "Development of ISO 11783 Compliant Agricultural Systems: Experience Report", Automotive Systems and Software Engineering, Springer Nature Switzerland AG 2019, pp. 197-223 (Year: 2019).*

(Continued)

*Primary Examiner* — Tamara L Weber
(74) *Attorney, Agent, or Firm* — Christopher J. Volkmann; KELLY, HOLT & CHRISTENSON PLLC

(57)     ABSTRACT
A grain cart-specific control system is configured to control a grain cart. A master control system interacts with the grain cart-specific control system in order to issue master control commands. The grain cart-specific control system receives the master control commands and executes grain cart-specific commands to carry out the master control commands.

20 Claims, 14 Drawing Sheets

(56) References Cited

U.S. PATENT DOCUMENTS

| | | | |
|---|---|---|---|
| 9,187,259 | B2 | 11/2015 | Van Mill et al. |
| 9,272,853 | B2 | 3/2016 | Van Mill et al. |
| 9,392,746 | B2 | 7/2016 | Darr et al. |
| 9,457,971 | B2 | 10/2016 | Bonefas et al. |
| 9,529,364 | B2 | 12/2016 | Foster et al. |
| 9,545,048 | B2 | 1/2017 | Pickett et al. |
| 9,596,805 | B2 | 3/2017 | Van Mill et al. |
| 9,596,809 | B2 | 3/2017 | Van Mill et al. |
| 9,615,509 | B2 | 4/2017 | Flickinger et al. |
| 9,642,305 | B2 | 5/2017 | Nykamp et al. |
| 9,763,389 | B2 | 9/2017 | Bump et al. |
| 9,820,436 | B2 | 11/2017 | Inoue et al. |
| 9,861,040 | B2 | 1/2018 | Bonefas |
| 9,873,570 | B2 | 1/2018 | Van Mill et al. |
| 10,019,790 | B2 | 7/2018 | Bonefas et al. |
| 10,028,434 | B2 | 7/2018 | Van Mill et al. |
| 10,028,441 | B2 | 7/2018 | Van Mill et al. |
| 10,028,442 | B1 | 7/2018 | Crosby |
| 10,106,333 | B2 | 10/2018 | Beaujot et al. |
| 10,278,328 | B2 | 5/2019 | Thomson et al. |
| 10,292,327 | B2 | 5/2019 | Ducroquet et al. |
| 10,351,364 | B2 | 7/2019 | Green et al. |
| 10,406,961 | B2 | 9/2019 | Grodecki et al. |
| 10,750,668 | B1 | 8/2020 | Minnich et al. |
| 10,760,946 | B2 | 9/2020 | Meier et al. |
| 10,765,063 | B2 | 9/2020 | Van Mill et al. |
| 10,807,812 | B2 | 10/2020 | Thomson et al. |
| 10,830,634 | B2 | 11/2020 | Blank et al. |
| 11,008,177 | B2 | 5/2021 | Banthia et al. |
| 11,188,098 | B2 | 11/2021 | Desai et al. |
| 11,310,963 | B2 | 4/2022 | Burnley et al. |
| 11,457,562 | B2 | 10/2022 | Van Mill et al. |
| 11,542,109 | B2 | 1/2023 | Stander et al. |
| 11,803,188 | B1 | 10/2023 | Gupta et al. |
| 11,825,765 | B2 | 11/2023 | Van Mill et al. |
| 12,004,449 | B2 | 6/2024 | Faust et al. |
| 12,013,702 | B2 | 6/2024 | Stander et al. |
| 12,317,777 | B2 | 6/2025 | Apte et al. |
| 12,344,260 | B2 | 7/2025 | Appleton et al. |
| 12,353,210 | B2 | 7/2025 | Wilson et al. |
| 12,439,853 | B2 | 10/2025 | O'Connor et al. |
| 12,490,678 | B2 | 12/2025 | O'Connor et al. |
| 12,543,655 | B2 | 2/2026 | Wegmann et al. |
| 2009/0321154 | A1 | 12/2009 | Johnson |
| 2011/0220677 | A1 | 9/2011 | Bertolani et al. |
| 2013/0045067 | A1 | 2/2013 | Pickett et al. |
| 2013/0213518 | A1 | 8/2013 | Bonefas |
| 2015/0264866 | A1* | 9/2015 | Foster .................... B65G 67/04 414/21 |
| 2015/0327425 | A1 | 11/2015 | Dillon |
| 2016/0251167 | A1 | 9/2016 | Van Mill et al. |
| 2018/0091946 | A1 | 3/2018 | Venkatraman et al. |
| 2018/0173221 | A1 | 6/2018 | Samaraweera |
| 2019/0092208 | A1 | 3/2019 | Koenig |
| 2019/0113624 | A1 | 4/2019 | Robinson et al. |
| 2019/0141899 | A1* | 5/2019 | Winsnes .............. B65G 45/005 414/519 |
| 2019/0277687 | A1 | 9/2019 | Blank et al. |
| 2020/0064144 | A1 | 2/2020 | Tomita et al. |
| 2020/0064826 | A1 | 2/2020 | Engle et al. |
| 2020/0068781 | A1 | 3/2020 | Hershbarger |
| 2020/0128738 | A1 | 4/2020 | Suleman et al. |
| 2020/0353510 | A1 | 11/2020 | Chandler |
| 2021/0026362 | A1 | 1/2021 | Wilson et al. |
| 2021/0072764 | A1 | 3/2021 | Kean |
| 2021/0103880 | A1 | 4/2021 | Wu |
| 2021/0195840 | A1 | 7/2021 | Puryk et al. |
| 2021/0294337 | A1 | 9/2021 | Van Mill et al. |
| 2021/0339729 | A1 | 11/2021 | O'Connor et al. |
| 2022/0011444 | A1 | 1/2022 | Eichhorn et al. |
| 2022/0019240 | A1 | 1/2022 | Christiansen et al. |
| 2022/0071078 | A1 | 3/2022 | Boyer et al. |
| 2022/0083029 | A1 | 3/2022 | Hunsaker et al. |
| 2022/0304231 | A1 | 9/2022 | Faust et al. |
| 2022/0408641 | A1 | 12/2022 | Van Mill et al. |
| 2023/0029905 | A1 | 2/2023 | Clark |
| 2023/0276735 | A1 | 9/2023 | Corban et al. |
| 2023/0363311 | A1 | 11/2023 | O'Connor et al. |
| 2024/0032469 | A1 | 2/2024 | Christiansen et al. |
| 2024/0138312 | A1 | 5/2024 | Wegmann et al. |
| 2024/0341232 | A1 | 10/2024 | O'Connor et al. |
| 2024/0345583 | A1 | 10/2024 | Wagh et al. |
| 2025/0278099 | A1 | 9/2025 | Wegmann et al. |
| 2025/0321131 | A1 | 10/2025 | Wegmann et al. |
| 2025/0321554 | A1 | 10/2025 | Wegmann et al. |
| 2025/0359515 | A1 | 11/2025 | Wonderlich et al. |

FOREIGN PATENT DOCUMENTS

| | | | |
|---|---|---|---|
| DE | 102014105643 | A1 | 10/2014 |
| DE | 112013000939 | T5 | 11/2014 |
| DE | 102021208055 | A1 | 3/2022 |
| DE | 102024116062 | A1 | 1/2025 |
| DE | 102024123278 | A1 | 4/2025 |
| EP | 4311411 | A1 | 1/2024 |
| GB | 1104906 | A | 3/1968 |
| JP | 2020135793 | A2 | 8/2020 |
| WO | WO 2013025687 | A1 | 2/2013 |
| WO | 2018102524 | A1 | 6/2018 |
| WO | 2023150219 | A1 | 8/2023 |

OTHER PUBLICATIONS

1950 Dual Auger Grain Cart—Killbros Farm Equipment, retrieved from https://web.archive.org/web/20160203214035/https://www.killbrosequip.com/grain-carts/1950/, 2016, 8 pages.

International Search Report and Written Opinion for application No. PCT/US2025/017365 dated May 12, 2025, 18 pages.

German Search Report issued in application No. 102024136879.9 dated Aug. 11, 2025, 10 pages.

German Search Report issued in application No. 102024133840.7 dated Aug. 18, 2025, 08 pages.

Kurita H., et al., "Application of Image Processing Technology for Unloading Automation of Robot Combine Harvester," 2011 IEEE/SICE International Symposium on System Integration (SIII), 2011, Kyoto, Japan, pp. 36-40.

\* cited by examiner

GRAIN CART-SPECIFIC CONTROL SYSTEM FOR AUTOMATED GRAIN CART UNLOADING

FIELD OF THE DESCRIPTION

The present description relates to agricultural equipment. More specifically, the present description relates to automatically controlling a grain cart during an automated unloading operation.

BACKGROUND

There are a wide variety of different types of agricultural equipment. Some such agricultural equipment includes agricultural harvesters. Agricultural harvesters often engage crop, process that crop, and unload the crop into a receiving vehicle, such as a tractor-pulled grain cart.

Once the receiving vehicle is filled to a desired fill level with harvested material, a propulsion vehicle (such as a tractor or other vehicle) that pulls the receiving vehicle moves the harvested material in the grain cart to a container (such as a haulage vehicle—e.g., a semi-trailer) and transfers the harvested material from the grain cart to the container. The propulsion vehicle approaches the container, pulls alongside the container, and then engages an unloading auger on the grain cart to unload the harvested material from the grain cart into the container.

There are many different types of grain carts. Those grain carts may be controlled in a variety of different ways. For instance, the grain carts may be of different sizes and volume capacities. The unloading augers may fold or move from a transport position to a deployed, unload position, in different ways. There may be different types of actuators that are used for positioning the auger. Similarly, some unloading augers may be fitted with a spout that can be used to direct the trajectory of material as the material exits the auger. Further, the communication and control harness that attaches the grain cart to a control system on the propulsion vehicle may have a different configuration, depending upon the type of grain cart or the grain cart manufacturer.

The discussion above is merely provided for general background information and is not intended to be used as an aid in determining the scope of the claimed subject matter.

SUMMARY

A grain cart-specific control system is configured to control a grain cart. A master control system interacts with the grain cart-specific control system in order to issue master control commands. The grain cart-specific control system receives the master control commands and executes grain cart-specific commands to carry out the master control commands.

Example 1 is a computer implemented method of controlling a grain cart pulled by a propulsion vehicle, comprising:

generating a master command with a master control system on the propulsion vehicle, the master command identifying a grain cart operation to be performed;

receiving the master command at a grain cart-specific control system on the propulsion vehicle configured to generate a set of grain cart-specific commands based the master command; and generating a control signal with the grain cart-specific control system to control an actuator on the grain cart to execute the set of grain cart-specific commands.

Example 2 is the computer implemented method of any or all previous examples wherein generating the master command with the master control system comprises:

detecting that the grain cart is in an unloading position relative to a container;

generating, as the master command, a power-up command commanding the grain cart-specific control system to perform a power-up sequence; and generating the control signal with the grain cart-specific control system to perform the power-up sequence.

Example 3 is the computer implemented method of any or all previous examples wherein generating the control signal with the grain cart-specific control system to perform the power-up sequence comprises:

generating control signals to control actuators on the grain cart to configure the grain cart for unloading material from the grain cart into the container.

Example 4 is the computer implemented method of any or all previous examples wherein the propulsion vehicle has an engine, and the grain cart has an unloading auger and further comprising:

after the auger is in a deployed position to perform an unloading operation, generating an engine slow signal to slow a speed of the engine to a first speed;

generating an engage pto signal to engage a power takeoff; and generating an engine fast signal to control the speed of the engine to a second speed, faster than the first speed.

Example 5 is the computer implemented method of any or all previous examples wherein the grain cart has a gate that opens to allow material to flow to the auger and wherein generating control signals to control actuators on the grain cart to configure the grain cart for unloading material from the grain cart into the container comprises:

generating an open gate signal to control a gate actuator to move the gate into an open position.

Example 6 is the computer implemented method of any or all previous examples wherein generating a master command comprises generating an unload rate request indicative of a requested rate at which material is unloaded from the grain cart to the container, wherein generating the control signal with the grain cart-specific control system comprises:

generating a gate actuator control signal to control a position of the gate based on the unload rate request.

Example 7 is the computer implemented method of any or all previous examples wherein generating a master command comprises generating an auger unfold command and wherein generating a control signal with the grain cart-specific control system comprises:

generating an auger position control signal to control an auger position actuator to move the auger to the deployed position based on the auger unfold command.

Example 8 is the computer implemented method of any or all previous examples wherein the grain cart includes a spout and a spout position actuator that positions the spout and wherein generating a control signal with the grain cart-specific control system comprises:

generating a spout position control signal to control the spout position actuator to move the spout into the deployed position based on the auger unfold command.

Example 9 is the computer implemented method of any or all previous examples wherein generating the master command comprises:

detecting that an unloading operation is complete; and generating, as the master command, a command for the grain cart-specific control system, to perform a power down sequence and further comprising generating the control signal with the grain cart-specific control system to perform the power down sequence.

Example 10 is the computer implemented method of any or all previous examples wherein generating the control signal with the grain cart-specific control system to perform the power down sequence comprises:

generating a gate close signal to control the gate actuator to move the gate to a closed position;

controlling the auger to run for a clean out time period;

generating an engine slow signal to slow a speed of the engine to the first speed;

generating a disengage pto signal to disengage the power takeoff; and generating an engine fast signal to control the speed of the engine to the second speed, faster than the first speed.

Example 11 is the computer implemented method of any or all previous examples wherein generating a master command comprises generating an auger fold command and wherein generating a control signal with the grain cart-specific control system comprises:

generating an auger position control signal to control the auger position actuator to move the auger to the folded position based on the auger fold command.

Example 12 is the computer implemented method of any or all previous examples and further comprising:

accessing grain cart-specific configuration values; and configuring the grain cart-specific control system, based on the grain cart-specific configuration values, to generate the grain cart-specific commands.

Example 13 is the computer implemented method of any or all previous examples wherein accessing grain cart-specific configuration values comprises:

detecting a grain cart identifier identifying the grain cart; and downloading a grain cart model based on the grain cart identifier.

Example 14 is the computer implemented method of any or all previous examples wherein accessing grain cart-specific configuration values comprises:

conducting a configuration user experience to receive user configuration inputs indicative of a configuration of the grain cart.

Example 15 is the computer implemented method of any or all previous examples wherein conducting a configuration user experience to receive user configuration inputs comprises:

generating an interactive display;

prompting, on the interactive display, user manipulation of an actuator on the grain cart;

detecting configuration information based on the user manipulation of the actuator on the grain cart; and saving the configuration data corresponding to a grain cart identifier identifying the grain cart.

Example 16 is a control system on a propulsion vehicle for controlling a grain cart propelled by the propulsion vehicle, the control system comprising:

a master control system configured to generate a grain cart independent master command identifying a grain cart operation to be performed;

a grain cart-specific control system configured to receive the master command and generate a set of grain cart-specific commands based the master command to control an actuator on the grain cart to execute the set of grain cart-specific commands; and a grain cart control configuration system configured to access grain cart-specific configuration values and configure the grain cart-specific control system, based on the grain cart-specific configuration values, to generate the grain cart-specific commands.

Example 17 is the control system of any or all previous examples wherein the master control system comprises:

a vehicle position control system configured to detect that the grain cart is in an unloading position relative to a container;

an unload operation control system configured to generate, as the master command, a power-up command commanding the grain cart-specific control system to perform a power-up sequence.

Example 18 is the control system of any or all previous examples wherein the master control system comprises:

a fill strategy controller configured to detect when an unloading operation is complete; and an unload operation control system configured to generate, as the master command, a power down command commanding the grain cart-specific control system to perform a power down sequence.

Example 19 is the control system of any or all previous examples wherein the grain cart includes a gate and a gate actuator and further comprising an unload rate request generator configured to generate an unload rate request indicative of a requested rate at which material is unloaded from the grain cart to the container and wherein the grain cart-specific control system comprises:

a gate controller configured to generate a gate actuator control signal to control the gate actuator to control a position of the gate based on the unload rate request.

Example 20 is a propulsion vehicle that propels a grain cart, comprising:

an engine;

a propulsion subsystem;

a steering subsystem;

a master control system configured to generate a master command, the master command identifying a grain cart operation to be performed;

a grain cart-specific control system configured to receive the master command and generate a set of grain cart-specific commands based the master command; and a controller configured to generate a control signal to control an actuator on the grain cart to execute the set of grain cart-specific commands.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are a wide variety of different types of grain carts that can be used as receiving vehicles in a harvesting operation. In order to perform automated unloading of the grain cart into a container (such as a haulage vehicle—e.g., a semi-trailer) it is therefore difficult to generate a control system that can be used to control a wide variety of different grain carts, because there are so many differences in the way grain carts are configured and controlled.

The present discussion thus proceeds with respect to a description of a system in which a master control system is used to issue high level commands to control a grain cart during an unloading operation. A grain cart-specific control system is used to carry out the high-level commands on a specific grain cart. The grain cart-specific control system can be configured for the specific grain cart and can then be used to interpret the high-level commands and generate control signals to take steps to execute those high-level commands on a specific grain cart. Therefore, the control system need not be redesigned for every specific grain cart. Instead, the master control system can be used across a plurality of different types and configurations of grain carts and the grain cart-specific control system can be configured automatically or through an operator or user interface for any of a wide variety of different specific types of grain carts.

Figure 1:
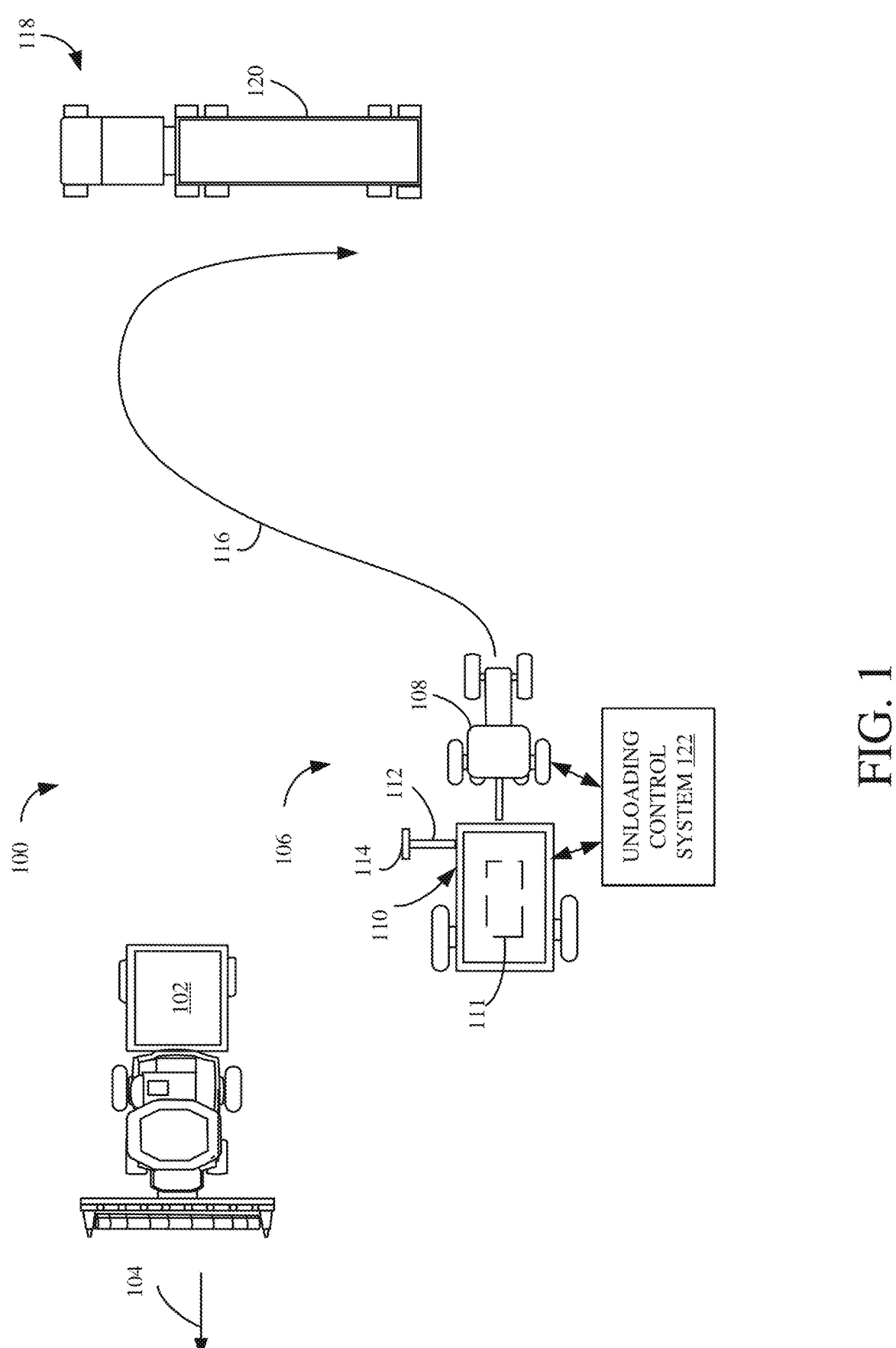
FIG. 1 is a pictorial illustration of one example of an agricultural system.

FIG. 1 is a pictorial illustration of one example of an agricultural system 100 in which a harvester 102 is moving through a field in the direction indicated by arrow 104. A receiving vehicle 106 includes a propulsion vehicle (e.g., a tractor) 108 and a grain cart 110. Grain cart 100 is shown having an auger 112 and spout 114 that are used to unload harvested material from grain cart 110. In the example shown in FIG. 1, grain cart 110 has been filled with harvested material from harvester 102 and is traveling along a travel path indicated by arrow 116 toward a container (e.g., a semi-truck) 118. In order to unload material from grain cart 110, tractor 108 pulls the grain cart 110 along the side of semi-trailer 120 so that the auger 112 can be engaged to transfer material from grain cart 110 into semi-trailer 120. In one example, auger 112 is driven by a power takeoff on tractor 108.

Grain cart 110 is, in one example, fitted at its lower end with a gate 111 which can be opened to allow grain to pass out of grain cart 110 and into a hopper or another container that feeds auger 112. The extent to which gate 111 is opened along with the speed of rotation of auger 112, determine the rate at which harvested material is removed from grain cart 110 and loaded into semi-trailer 120.

Also, in the example shown in FIG. 1, an unloading control system 122 can be deployed on tractor 108, grain cart 110, in a remote server environment, or disbursed among a plurality of different locations. Unloading control system 122, in one example, generates control signals to automatically control the unloading of harvested material from grain cart 110 into semi-trailer 120. Unloading control system 122 is described in greater detail below. By "automatically", it is meant that the operation or function can be carried out without further human involvement except, perhaps, to initiate or authorize the operation or function.

Thus, as tractor 108 approaches semi-trailer 120, unloading control system 122 can detect that tractor 108 is approaching semi-trailer 120. Then, when in sensor range of sensors on receiving vehicle 106, unloading control system 122 can sense the position of semi-trailer 120 and generate control signals to control the propulsion and steering subsystems on tractor 108 to automatically move tractor 108 (and thus grain cart 110) along semi-trailer 120 to fill semi-trailer 120 with harvested material according to a fill strategy (such as a front-to-back fill strategy, a back-to-front fill strategy, a multi-pass fill strategy, etc.).

As discussed elsewhere herein, there are many different types of grain carts 110. For example, in some grain carts, the auger 112 is foldable along multiple different axes. Further, spout 114 may be movable along different axes. In addition, the mechanisms or actuators for changing the position of auger 112 and spout 114 may be different from one grain cart to the next. The speed at which the auger 112 is driven may be different as well.

In addition, the configuration of the actuator for opening and closing gate 111 may also be different among different grain carts.

Therefore, in one example, unloading control system 122 has a master control system that generates high level commands (or master commands) for controlling grain cart 110 during the unloading operation, as well as a grain cart-specific control system which is configured to generate grain cart-specific control signals to carry out the master commands generated by the control system. For instance, the master control system may generate a control command to deploy auger 112 to its unloading position. The grain cart-specific control system then generates the specific control signals used by the specific grain cart 110 (or the specific type of grain cart 110) to properly actuate the particular actuators on grain cart 110 that are used to move auger 112 from a transport position to a deployed, unloading position. This is just one example and other examples of the operation of the master control system and grain cart-specific control system are discussed elsewhere herein.

Therefore, in one example, a master command is a command that applies to multiple different types of grain carts, such as to deploy the auger and spout, start unloading, stop unloading, fold the auger and spout, etc., but which is carried out differently on the different types of grain carts. The grain cart-specific commands are commands used to control a specific type of grain cart to carry out or execute a master command.

Figures 2A, 2B, 2C:
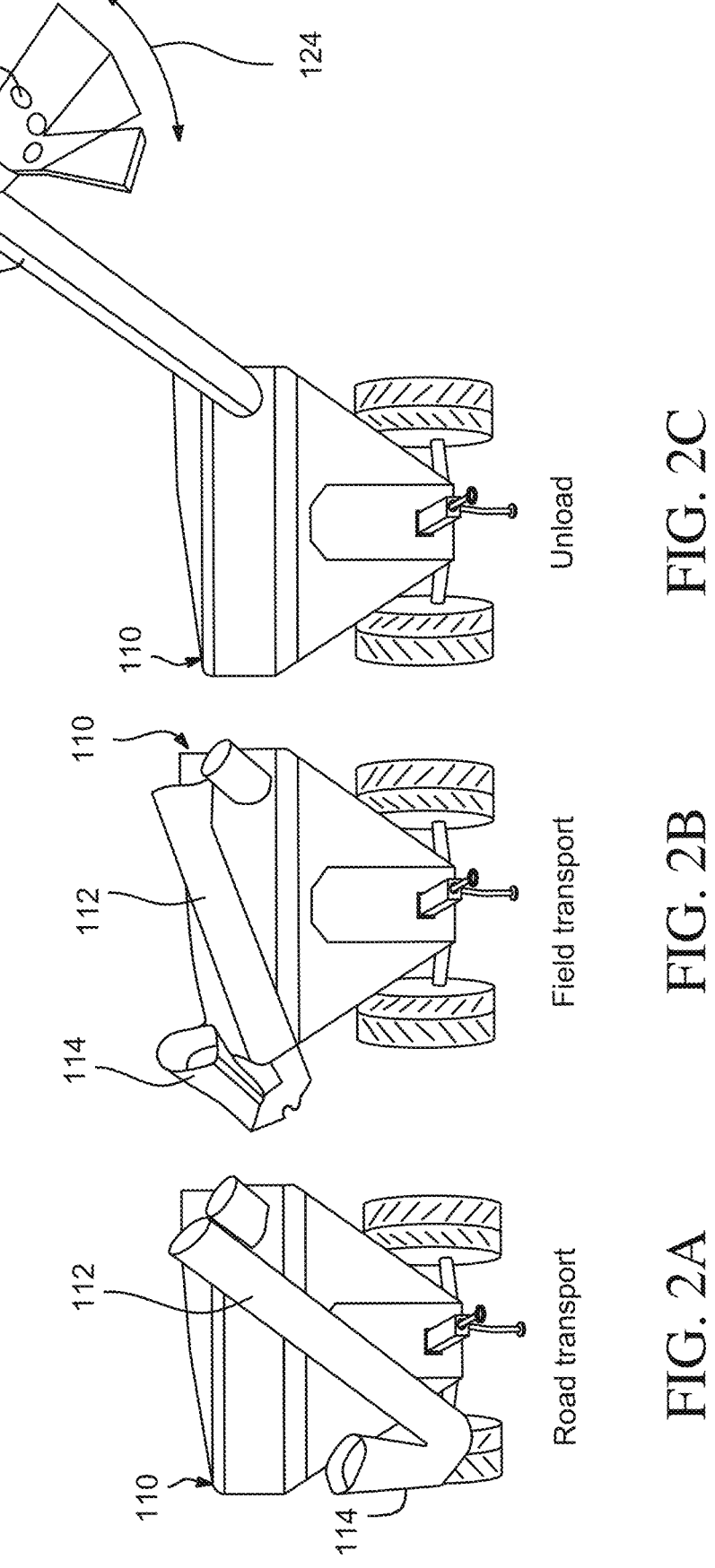
FIGS. 2A, 2B, and 2C show one example of a grain cart in a plurality of different positions.

For purposes of example, FIGS. 2A, 2B, and 2C are pictorial illustrations of one example of a grain cart 110. FIG. 2A shows that auger 112 and spout 114 are in a road transport position. Such a position may be suitable when a propulsion vehicle tows grain cart 110 over a road. In the example shown in FIG. 2B, grain cart 110 is configured with auger 112 and spout 114 in a field transport position. The field transport position may be used when the propulsion vehicle 108 is towing grain cart 110 between harvester 102 and container 118. FIG. 2C shows grain cart 110 with auger 112 and spout 114 in a deployed or unload position. In the example shown in FIG. 2C, grain cart 110 is configured with a movable spout 114 which can be moved generally along the direction indicated by arrow 124. Thus, spout 114 can be moved to change the trajectory of material exiting auger 112.

As noted, there are a wide variety of different types of grain carts. Some grain carts do not have a road transport position and a field transport position. Other grain carts have a foldable auger 112. Further, as discussed above, different grain carts may have different gate configurations in which the gate 111 on one grain cart can be opened to a greater or lesser extent than the gate 111 on another grain cart. In addition, different grain carts may have different sensors that sense the position of auger 112 and spout 114, the position of the gate 111, etc. Also, different grain carts may have actuators for driving movement of auger 112, spout 114, and gate 111 using different voltages or different types of control signals. Further, the wiring harness or other communication and power harness that couples grain cart 110 to the towing vehicle 108 may have different pin configurations or different wiring configurations, depending upon the grain cart. Thus, as discussed above, it can be very difficult to design a single control system to automatically control different kinds of grain carts 110 during an unload operation. The present description thus proceeds with respect to a configurable system that includes a master control system and a grain cart-specific control system.

Figure 3A:
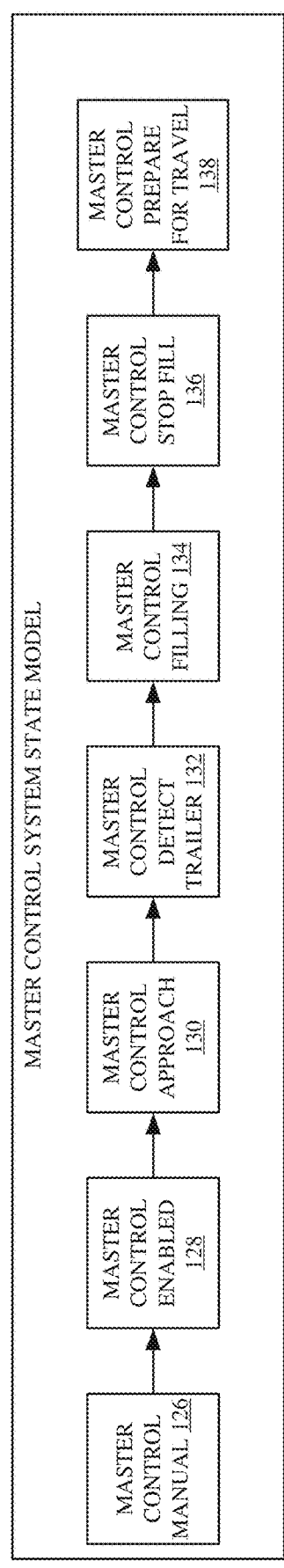
FIG. 3A is a state diagram illustrating the states of one example of a master control system.
Figure 3B:
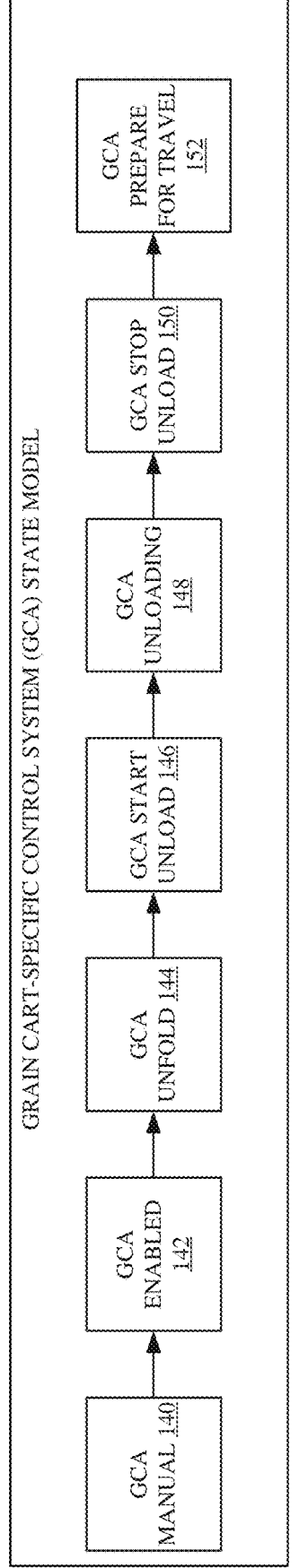
FIG. 3B is a state diagram illustrating the states of one example of a grain cart-specific control system.

FIG. 3A is a simplified state diagram showing one example of the different states of the master control system, and FIG. 3B is a simplified state diagram showing one example of the states of the grain cart-specific control system. In FIG. 3A, the master control system can start in a manual state indicated by block 126. In the manual state, the master control system operates as if no automation is enabled. This allows for normal manual operation of the towing vehicle and grain cart. When the master control system is in the enabled state, as indicated by block 128, then the master control system responds to operator inputs but does not perform any automated operations without an operator input. In the approach state 130, the master control system begins to detect the container 118, as well as its distance and pose. The master control system can begin automatically controlling the propulsion and steering subsystems on towing vehicle 108 to approach the semi-trailer 120. In the detect trailer state 132, the on-board sensors on towing vehicle 108 have detected the semi-trailer 120 and the master control system may issue a master command requesting that the auger 112 be positioned in the deployed position. The master control system can also begin controlling the propulsion and steering subsystems on the towing vehicle 108 to nudge the towing vehicle 108 along the side of trailer 120 to reach a desired location to begin the unload operation. In the filling state 134, the master control system will issue master commands to begin unloading gran cart 110 and filling semi-trailer 120. The master control system can generate unload rate requests indicating the desired rate at which harvested material should be unloaded from grain cart 110. This allows the grain cart-specific control system to control the gate 111 on grain cart 110 and the speed of the engine in order to achieve the desired unloading rate. The master control system can also generate master commands to move the grain cart along the side of semi-trailer 120 in order to execute a desired fill strategy. In the stop fill state 136, the master control system issues a master command commanding the grain cart-specific control system to stop unloading. This may occur, for instance, when the semi-trailer 120 is full, or for other reasons. In the prepare for travel state 138, the master control system can generate master commands commanding the grain cart to be moved back into a desired configuration for transport back to the harvester 102, such as by folding auger 112, and/or taking other steps.

At any time during operation, the master control system can enter a fault state in which automation is stopped in a manner that will minimize damage to the system when certain fault conditions occur, such as when a spill is detected, when an operator input is detected, or when other fault conditions are detected. In the fault state the master control system generates master commands to shut down the grain cart operation as well.

FIG. 3B shows that the state model for the grain cart-specific control system also includes a manual state 140 in which no automation is carried out. In the enabled state 142, the control system responds to operator inputs and will only automate operations based on operator inputs. In the unfold state 144, the grain cart-specific control system will extend auger 112 to the deployed position. In the start unload state 146, the grain cart-specific control system will perform grain cart-specific control operations to go through a startup sequence, described in greater detail below with respect to FIG. 6. In the unloading state 148, the grain cart-specific control system controls the gate 111 to meet the requested unload rate that is provided by the master control system, during an unloading operation. In the stop unload state 150, the grain cart-specific control system goes through a shutdown sequence which is also described in greater detail below with respect to FIG. 6. In the prepare for travel state 152, the grain cart-specific control system controls the actuators on the grain cart to place the grain cart back in condition for transport. The grain cart can be placed in a field transport configuration (as shown in FIG. 2B) or a road transport configuration (as shown in 2A), etc. The grain cart-specific control system can also reach a fault state in which automation is stopped.

In one example, there may be a plurality of different fault states. For instance, in a fault stop state, a fault condition is detected in which the system goes through a shutdown sequence and then disables automation. In a fault out-state, a fault condition is detected in which the system immediately disables automation without shutting down the current operating sequence (e.g., the operation of the grain cart 110 remains as is when the fault out condition is detected. These are only examples and other fault states may be implemented as well.

Figure 4A:
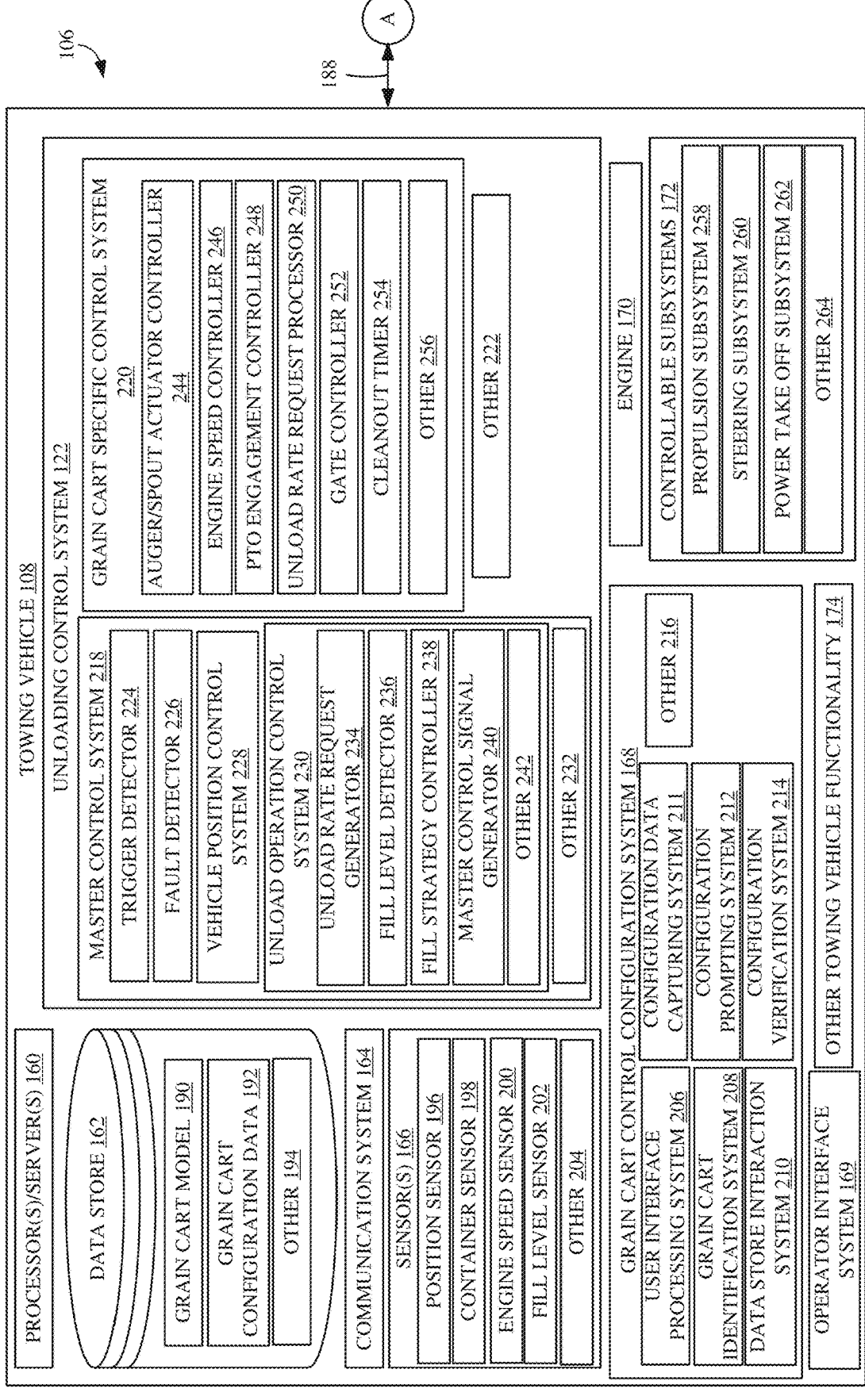
FIGS. 4A and 4B (collectively referred to herein as FIG. 4) illustrate a block diagram showing one example of a portion of an agricultural system (with a towing vehicle and grain cart) in more detail.
Figure 4B:
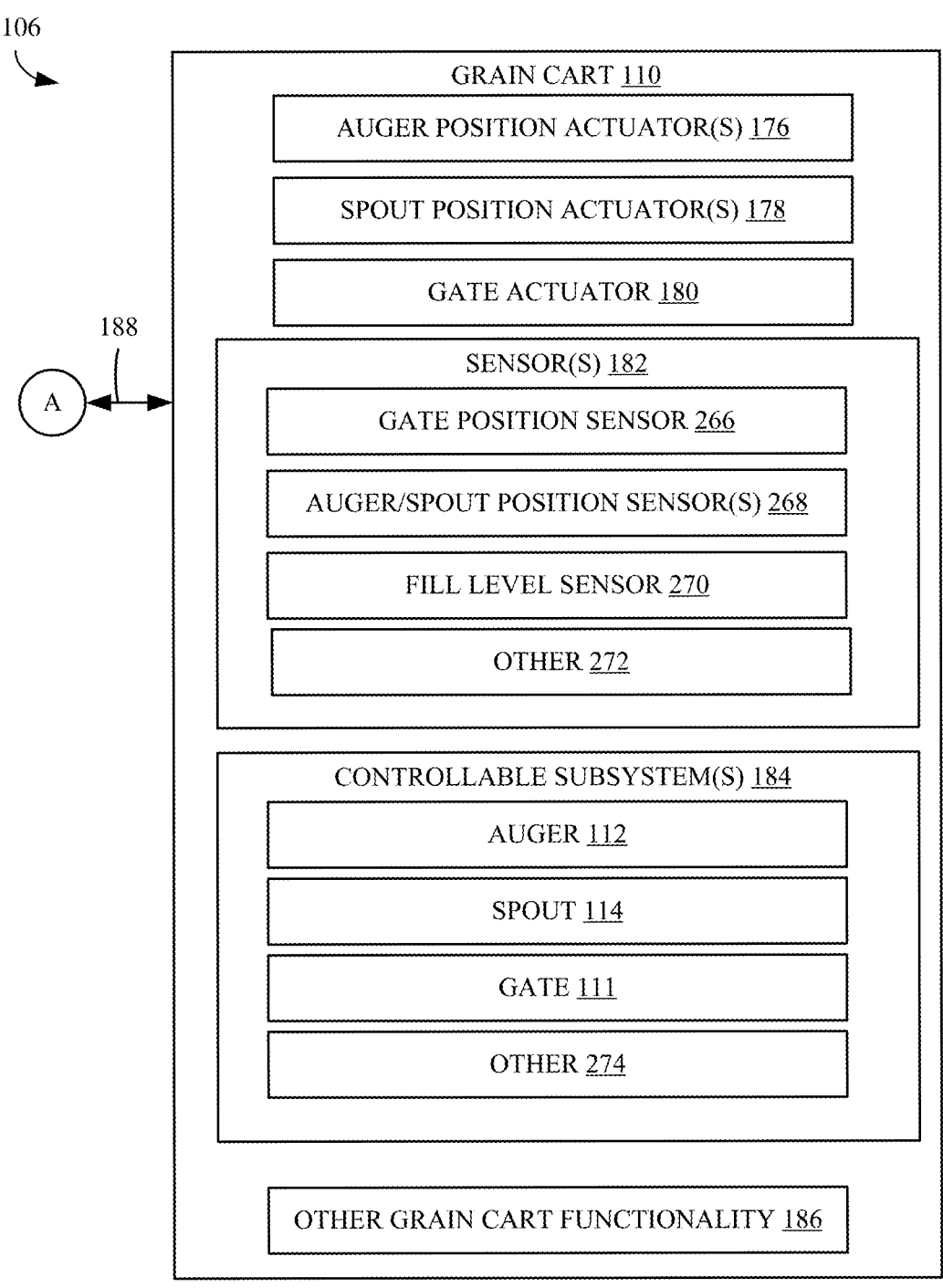

FIGS. 4A and 4B (collectively referred to herein as FIG. 4) illustrate a block diagram showing one example of receiving vehicle 106 in which towing vehicle 108 and grain cart 110 are shown in more detail. In the example shown in FIG. 4, towing vehicle 108 includes one or more processors or servers 160, data store 162, communication system 164, sensors 166, grain cart control configuration system 168, operator interface 169, unloading control system 122, engine 170, controllable subsystems 172, and other towing vehicle functionality 174. Grain cart 110 includes auger position actuator(s) 176, spout position actuator(s) 178, gate actuator 180, sensors 182, controllable subsystems 184, and other grain cart functionality 186. FIG. 4 also shows that the towing vehicle 108 is coupled to grain cart 110 over link

188. Link 188 can be a mechanical link, as well as an electrical link and/or other link. The link 188 can transmit power (such as PTO power, hydraulic power, electric power, etc.) to grain cart 110. Link 188 can be a unidirectional or bidirectional communication link that communicates control signals and/or other signals. Link 188 can include a wireless link as well. Data store 162 can include grain cart model 190, grain cart configuration data 192, and other items 194. Sensors 166 can include position sensor 196, container sensor 198, engine speed sensor 200, fill level sensor 202, and other items 204. Grain cart control configuration system 168 can include user interface processing system 206, grain cart identification system 208, data store interaction system 210, configuration data capturing system 211, configuration prompting system 212, configuration verification system 214, and other items 216. Operator interface 169 can include a steering wheel, joy sticks, pedals, levers, display screens, other audio, visual, and/or haptic devices for generating outputs to an operator and receiving inputs from an operator. Unloading control system 122 can include master control system 218, grain cart-specific control system 220, and other items 222. In the example shown in FIG. 4, master control system 218 includes trigger detector 224, fault detector 226, vehicle position control system 228, unload operation control system 230, and other items 232. Unload operation control system 230 can include unload rate request generator 234, fill level detector 236, fill strategy controller 238, master control signal generator 240, and other items 242. Grain cart-specific control system 220 can include auger/spout actuator controller 244, engine speed controller 246, PTO engagement controller 248, unload rate request processor 250, gate controller 252, clean out timer 254, and other items 256. Controllable subsystems 172 can include propulsion subsystem 258, steering subsystem 260, power takeoff subsystem 262, and other items 264.

On grain cart 110, sensors 182 can include gate position sensor 266, auger/spout position sensors 268, fill level sensor 270, and other items 272. Controllable subsystems 184 can include auger 112, spout 114, gate 111, and other items 274. Before describing the overall operation of agricultural system 100 and receiving vehicle 106, a description of some of the items on receiving vehicle 106, and their operation, will first be described.

Grain cart model 190 may be data that models the grain cart 110. For instance, grain cart model 190 may include information indicating the type of auger 112 and spout 114, the pin configuration on a wiring harness which forms part of link 188, the different voltage levels that may be used to control grain cart 110, the sensors that are used, among other things. Grain cart model 190 may be indexed in data store 162 based on the make and model of the grain cart that is modeled, based upon the type of grain cart that is modeled, based on a specific cart identifier, or in other ways.

Grain cart configuration data 192 can include data that is similar to that in grain cart model 190, but that is generated by grain cart control configuration system 168 in response to operator inputs. Grain cart configuration data 192 can also be indexed based upon the make and model of grain cart 110, based upon another identifier of grain cart 110, based upon the type of grain cart 110, or in other ways.

Communication system 164 facilitates the communication of items on towing vehicle 108 and grain cart 110 with one another. Therefore, communication system 164 can include a controller area network (CAN) bus and bus controller. Communication system 164 can also facilitate the communication between towing vehicle 108 and grain cart 110 or with other systems or vehicles. Therefore, communication system 164 can include a wide area network communication system, a local area network communication system, a Bluetooth or Wi-Fi communication system, a near field communication system, a cellular communication system, or any of a wide variety of other systems or combinations of systems.

Position sensor 196 can generate an output indicative of the position of position sensor 196 in a global or local coordinate system. Position sensor 196 may be a global navigation satellite system (GNSS) receiver, a cellular triangulation system, a dead reckoning system, or any of a wide variety of other position sensors. Container sensor 198 illustratively includes one or more sensors or detectors that can detect the location and orientation of container 118 (and in the present example, trailer 120). Therefore, container sensor 198 can include an optical sensor (such as a stereo camera with an image processing system), a RADAR sensor, a LIDAR sensor, an ultrasound sensor, an ultrawide band sensor, or other sensors. Engine speed sensor 200 generates an output indicative of the engine speed of engine 170. Engine speed sensor 200 can sense the output of engine 170, a throttle input to engine 170, or another variable indicative of the speed of engine 170. Fill level sensor 202 may be an optical sensor or another sensor that is used to detect a fill level of material in grain cart 110 and/or a fill level of material in trailer 120. Fill level sensor 202 may be a camera located on towing vehicle 108 that is positioned (such as on auger 112) with a field of view inside grain cart 110 and/or a camera that is positioned with a field of view inside trailer 120 when receiving vehicle 106 is alongside trailer 120 to unload material into trailer 120. The fill level sensor 202 may provide an output indicative of the fill level or an output that can be processed to derive the fill level (such as using image processing or other signal processing).

Grain cart control configuration system 168 is used to generate a user experience so that a user (such as a technician, an operator, or another user) can configure grain cart-specific control system 220 for a grain cart 110. In one example, user interface processing system 206 generates a user interface on operator interface system 169 for interaction by an operator or another user. Grain cart identification system 208 identifies the particular grain cart 110 for which the grain cart-specific control system 220 is being configured. Thus, grain cart identification system 208 can automatically read an identifier on grain cart 110 or generate a user input mechanism that allows the operator or user to select the grain cart or otherwise specify the type of grain cart.

Data store interaction system 210 can extract grain cart configuration data 192 or grain cart model 190 from data store 162, and can also store grain cart configuration data 192 or a grain cart model 190 that is obtained through user interface processing system 206 for later use by grain cart-specific control system 220. Configuration prompting system 212 prompts the operator or other user for values that are needed to generate the grain cart configuration data 192 or grain cart model 190. For instance, Table 1 shows one example of instructions that can be used so that the operator or user performs operations and enters data (or so capturing system 112 automatically captures data) that can be used to generate the grain cart configuration data 192 or grain cart model 190.

11

TABLE 1

Allow the operator to access the screen and request to configure
the system
Configure the following functions
Gate Open
Gate Closed
Auger Folded
Auger Extended
Spout pointed Outbound
Spout pointed Inbound
Configure as follows
Request that the operator use a control paddle to perform the following:
Open the Gate all the way and acknowledge maintaining for 4 seconds
Close the gate so it is approximately 95% open. Acknowledge
Close the Gate all the way to acknowledge maintaining for 4 seconds
Open the gate so it is approximately 5% open. Acknowledge
Fold the Auger all the way and acknowledge maintaining for 4 seconds
Extend the Auger so it is a few degrees from folded. Acknowledge
Extend the Auger all the way and acknowledge maintaining for 4
seconds
Fold the Auger so it is a few degrees from extended. Acknowledge
Point the Spout fully inboard and acknowledge maintaining for 4
seconds
At this time the software will have detected the following
Which control paddle is performing the function
The flow direction to perform the function (left port or right port)
The sensor pin for the function (if there is one)
The values of the sensor voltage detection threshold
The value of the sensor voltage undetected threshold
Request that the operator allow further calibration checks
Cycle through each function at full flow
Cycle through each function at 2/3 of full flow
Cycle through each function at 1/3 of full flow
While going through the function, record the length of time to go from
extended to retracted position at various flow rates Configuration verification system 214 can be used to verify the configuration data entered by the operator or user or automatically detected by configuration prompting system 212 and configuration data capture system 211. Configuration data capture system 211 can be used to capture or sense configuration data based upon user or operator inputs. For instance, the user or operator may be instructed to perform an operation (e.g., to open gate 111 all the way). At that point, configuration data capture system 211 may capture any configuration data corresponding to the gate 111 in the open position. This is just one example, as are the specific operations and configuration data shown in Table 1.

Master control system 218 performs high-level operations and generates high-level control commands (master commands) that are passed to grain cart-specific control system 220 and controllable subsystems 172. Grain cart-specific control system 220 then performs more fine-grained grain cart-specific operations to execute the master commands received by master control system 218. Some examples are described in greater detail below with respect to FIGS. 6, 7A, and 7B.

Trigger detector 224 detects conditions that indicate whether master control system 218 is in the manual state 126, or any of the other states illustrated in FIG. 3A. Fault detector 226 detects fault conditions. Vehicle position control system 228 detects the relative positions of receiving vehicle 106 and container 118 and controls the propulsion subsystem 258 and steering subsystem 260 to bring the two vehicles into close proximity relative to one another so that material can be unloaded from grain cart 110 into trailer 120. Unloading operation control system 230 can receive sensor inputs and/or other inputs and generate the master commands to perform and unloading operation. Unload rate request generator 234 generates an output indicative of a requested unloading rate. This can be used by unload rate request processor 250 to control how far to open gate 111 and how fast to control engine 170 (and thus the speed of power takeoff subsystem 262). Fill level detector 236 can receive an input from fill level sensor 202 and detect the fill level of trailer 120 to determine when the current location (where material is being loaded) in trailer 120 is filled to a desired level. Fill strategy controller 238 can use the fill level to determine when to control the vehicle position controller 228 to nudge the position of vehicle 106 relative to trailer 120 to fill trailer 120 according to a desired fill strategy (such as a front-to-back fill strategy, a back-to-front fill strategy, etc.). Master control signal generator 240 generates control signals indicative of the master commands (e.g., the nudge operations, the requested unloading rate, start/stop filling, auger fold/unfold, etc.), and provides those to grain cart-specific control system 220 and controllable subsystems 172, as needed.

Grain cart-specific control system 220 receives the master commands from master control system 218 and generates the grain cart-specific control signals to control grain cart 110 to execute the master commands. Auger/spout actuator controller 244 generates control signals to control the auger position actuators 176 and spout position actuator(s) 178 on grain cart 110. Therefore, auger/spout actuator controller 244 is programmed with the appropriate voltage ranges, pin configuration, timing parameters, etc., to generate the appropriate signal to control the position of auger 112 and spout 114 (by controlling auger position actuators 176 and spout position actuators 178) to unfold, fold, move to the road transport position, move to the field transport position, etc., based upon the mater commands from unload operation control system 230.

Engine speed controller 246 generates a control signal to control the speed of engine 170. The speed of engine 170 can be controlled in order to change the speed of power takeoff subsystem 262 to thus change the unload rate from grain cart 110. PTO engagement controller 248 controls the engagement of power takeoff system 262, and the disengagement of power takeoff system 262. Engine speed controller 246 and PTO engagement controller 248 can operate so that the engine speed 170 is reduced before power takeoff subsystem 262 is engaged or disengaged. Unload rate request processor 250 receives the unload rate request generated by unload rate request generator 234. Unload rate request processor 250 processes that request to determine the engine speed and gate position that should be used to reach the requested unload rate. Gate controller 252 generates control signals to control gate actuator 180 so that the position of gate 111 can be controlled. The position of gate 111 can also be modified to modify the unload rate. Clean out timer 254 can be set to different values, based upon the dimensions of auger 112, the speed of the auger 112, etc. Once gate 111 is closed, the auger 112 is cleaned out so that auger 112 runs for a given clean out time period after gate 111 is closed to remove all the harvested material from auger 112. Thus, clean out timer 254 may be a programmable timer, or a static timer that counts out a clean out time period once gate 111 is closed.

Propulsion subsystem 258 can be a transmission that is connected to the output of engine 170, or motors that drive ground engaging elements of towing vehicle 108 individually or in sets, or other propulsion elements. Steering subsystem 260 can include steerable wheels, skid steer wheels or tracks, or other controllable elements that can be controlled to change the heading or orientation of towing vehicle 108. Power takeoff subsystem 262 is a power takeoff that can be engaged and disengaged and that can be connected to unloading auger 112 in order to drive unloading auger 112 to move material from grain cart 110 to container 118.

On grain cart 110, auger position actuators 176 can be hydraulic, electric, electro-mechanical, pneumatic, or other actuators that are coupled to auger 112 to position auger 112 in the various positions (such as those shown in FIGS. 2A-2C). Spout position actuators 178 can also be any type of actuator that is used to position spout 114 relative to auger 112, as desired, in order to adjust the trajectory of material exiting spout 114. Gate actuator 180 is actuated to change the position of gate 111 between a fully open position and a fully closed position. Gate position sensor 266 senses the position of gate 111. Sensor 266 can thus be a Hall effect sensor, a sensor that senses the position of gate actuator 180, or other sensor. Auger/spout position sensors 268 sense the position of auger 112 and spout 114. Fill level sensor 270 may be the same as or different from fill level sensor 202. For instance, fill level sensor 270 may be a camera, such as a mono or stereo camera, or another sensor that senses the level of material in grain cart 110 and/or in container 118. By way of example, fill level sensor 270 may be a camera mounted on auger 112 and positioned to capture an image of the interior of container 118 during the unloading operation. Fill level detector 236 can receive a signal from fill level sensor 270 and generate an output indicative of the fill level within container 118. Grain cart 110 can include a wide variety of other functionality 186 as well.

Figure 5:
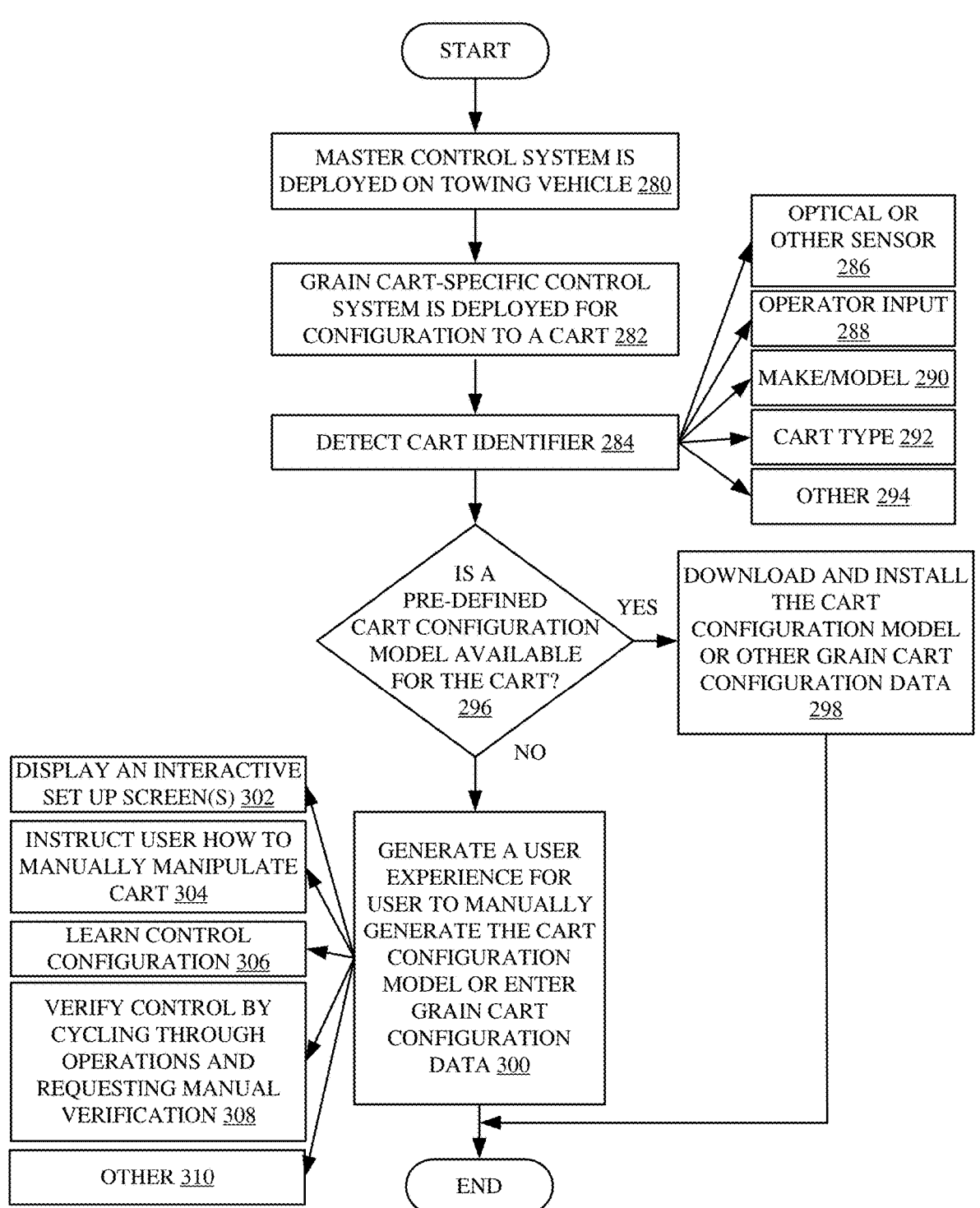
FIG. 5 is a flow diagram illustrating one example of configuring a grain cart-specific control system to control a specific grain cart.

FIG. 5 is a flow diagram illustrating one example of the operation of grain cart control configuration system 168 in directing a user experience so that a user can configure the grain cart-specific control system 220. It is first assumed that master control system 218 is deployed on towing vehicle 108, as indicated by block 280 in the flow diagram of FIG. 5. Also, grain cart-specific control system 220 is deployed for configuration to control a particular grain cart 110, as indicated by block 282.

Grain cart identification system 208 detects a grain cart identifier on grain cart 110, which identifies grain cart 110 for configuration system 168. Detecting a grain cart identifier is indicated by block 284 in the flow diagram of FIG. 5. Grain cart identification system 208 can use an optical or other sensor to sense an identifier located on grain cart 110 (such as a fiducial marker, another identifying tag, etc.). Identifying the grain cart using an optical or other sensor is indicated by block 286 in the flow diagram of FIG. 5. Grain cart identification system 208 can also receive an operator input 288 that identifies the grain cart. The grain cart can be identified based on the make and/or model of the grain cart, as indicated by block 290, the type of grain cart, as indicated by block 292, or another type of identifier, as indicated by block 294.

Once the cart is identified, data store interaction system 210 searches data store 162 to determine whether a cart configuration model (e.g., grain cart model) 190, or whether grain cart configuration data 192 is already available for this particular grain cart or type of grain cart. Determining whether a grain cart model 190 or grain cart configuration data 192 is available for this grain cart is indicated by block 296 in the flow diagram of FIG. 5.

If a grain cart model 190 or grain cart configuration data 192 is already available, then data store interaction system 210 downloads and installs that model or the configuration data to configure grain cart-specific control system 220 with the values it needs to translate the master commands received by master control system 218 into the grain cart-specific commands needed to execute those master commands. Downloading and installing the grain cart configuration model or other grain cart configuration data is indicated by block 298 in the flow diagram of FIG. 5.

If, at block 296, data store interaction system 210 determines that there is no grain cart model 190 or grain cart configuration data 192 for the identified grain cart 110, then configuration prompting system 212 generates a user experience for a user to manually generate the grain cart configuration model 190 or to otherwise enter the grain cart configuration data 192, as indicated by block 300 in the flow diagram of FIG. 5. Configuration data capture system 211 can also be used to automatically capture data, based upon user inputs or in other ways.

As one example, configuration prompting system 212 displays one or more interactive setup screens that prompt the user for values that will be used by grain cart-specific control system 220 to control grain cart 110. Displaying the interactive setup screens is indicated by block 302 in the flow diagram of FIG. 5. Those setup screens may instruct the user how to manually manipulate grain cart 110 so that values can automatically be detected or captured by configuration data capture system 211. For instance, the interactive screens may prompt the user to open gate 111 all the way. At that point configuration data capture system 211 may capture data (such as from the gate position sensor 266 or other data) that is indicative of the current position of gate 111, which pins were used to control gate 111, the signal levels used to control gate 111, etc. The interactive screens may prompt the operator to manually control the actuators to move the auger 112 to the different positions (such as those shown in FIG. 2A-2C) and configuration data capture system 211 can then capture data indicative of the auger 112 being in the different positions. The same can be done for spout 114, for power takeoff engagement and disengagement, for engine speed, and/or any of the other controllable elements on grain cart 110. Configuration data capture system 211 can also capture the pins or pin configuration used by grain cart 110 that contain data to be captured, the pins that are used to control actuators or other elements on grain cart 110, the voltage levels and timing parameters of the control signals, etc. Instructing the user how to manually manipulate grain cart 110 so that data can be captured is indicated by block 304 in the flow diagram of FIG. 5. Learning the control configuration, or capturing the configuration data is indicated by block 306.

Configuration verification system 214 can then verify grain cart control by cycling through different operations and asking a user to provide an input affirming that the desired operation was completed. For instance, the interactive setup screens 302 can indicate to the user that the system is attempting to move auger 112 from its road transport position to its deployed, unload position. The screen can also prompt the user to provide an input indicating whether the auger was properly moved between those two positions. In another example, the display screen may indicate that the grain cart-specific control system 220 is attempting to open gate 111 and then close gate 111, and ask the operator for an input verifying if and when those operations were successfully completed. This can be done to allow the operator to verify any or all other control operations as well. Verifying control by cycling through various operations and asking for manual verification is indicated by block 308 in the flow diagram of FIG. 5. Table 1 above shows one example of items that can be displayed on an interactive setup screen 302 generated for an operator. Generating a user experience can be done in other ways as well, in order to capture the configuration model 190 or configuration data 192, as indicated by block 310.

Figure 6:
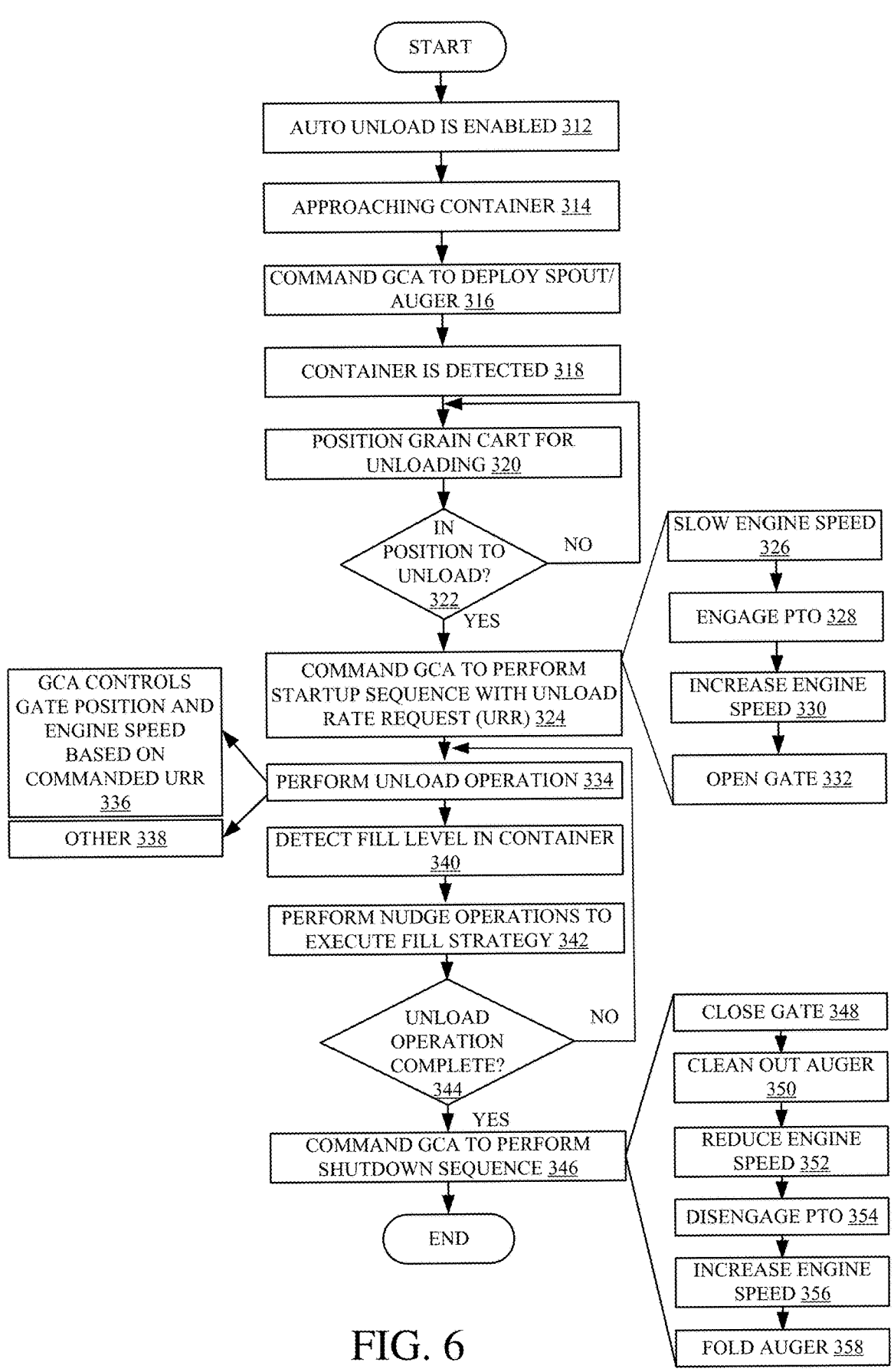
FIG. 6 is a flow diagram showing one example of the operation of an agricultural system in which a grain cart and towing vehicle approach a container, unload material into the container, and prepare to leave the container.

FIG. 6 is a flow diagram illustrating one example of the operation of unloading control system 122 after grain cart-specific control system 220 has been configured with the grain cart model 190 or grain cart configuration data 192 for the grain cart 110 that is being controlled.

It is first assumed that the unloading control system 122 is enabled to perform automated unloading operations, as indicated by block 312 in the flow diagram of FIG. 6.

Vehicle position control system 228 detects that towing vehicle 108 is approaching container 118. This can be detected in a wide variety of different ways. For instance, container 118 may be parked at a predefined location, or may be transmitting its global positioning coordinates or other coordinates so that its position can be compared with the current position of towing vehicle 108 generated by position sensor 196. Detecting that towing vehicle 108 is approaching container 118 is indicated by block 314 in the flow diagram of FIG. 6. This may act as a trigger for trigger detector 224 to indicate that unloading operation control system 230 should begin performing the automated unloading operation. Master control signal generator 240 then generates a master command to grain cart-specific control system 220 to deploy the auger 112 and spout 114 to the deployed position. Generating such a command is indicated by block 316 in the flow diagram of FIG. 6.

Once grain cart-specific control system 220 receives the command to deploy the spout 112 and auger 114, grain cart-specific control system 220 controls the auger position actuator 176 and spout position actuator 178 to deploy the auger and spout. One example of this is described in greater detail below with respect to FIG. 7.

Vehicle position control system 228 then detects container 118 (e.g., container sensors 198 may detect the container 118). Detecting the container 118 with the sensors 198 on board towing vehicle 108 is indicated by block 318 in the flow diagram of FIG. 6.

Vehicle position control system 228 then controls the controllable subsystems 172 to position grain cart 110 along the side of container 118 for unloading, as indicated by block 320 in the flow diagram of FIG. 6. Until grain cart 110 is in the unloading position adjacent container 118, vehicle position control system 228 continues to move the grain cart 110 into the unloading position, as indicated by block 322 in the flow diagram of FIG. 6.

Once the two vehicles are in the proper unload position relative to one another, unload control system 230 issues a master command to grain cart-specific control system 220 to perform a startup sequence. Unload rate request generator 234 also provides an unload rate request indicating a requested rate at which material is to be unloaded. Commanding the grain cart-specific control system 220 to perform a startup sequence is indicated by block 224 in the flow diagram of FIG. 6. In order to perform its startup sequence to prepare to unload, engine speed controller 246 generates a control signal to control engine 170 to slow the engine speed, as indicated by block 326. PTO engagement controller 248 then generates a control signal to engage the power takeoff subsystem 262, as indicated by block 328, and engine speed controller 246 then generates a control signal to again increase the engine speed of engine 170, as indicated by block 330 in the flow diagram of FIG. 6. Gate controller 252 then generates a control signal to control gate actuator 180 to open gate 111. Opening gate 111 is indicated by block 332 in the flow diagram of FIG. 6. Thus, the gate 111 is not opened until the PTO is engaged, and the engine speed is increased.

Unload operation control system 230 then generates control signals to perform an unloading operation. Unload rate request generator 234 generates unload rate requests and provides them as master commands to unload rate request processor 250. The engine speed, PTO engagement, and gate position are controlled to attain the requested unload rate. Fill strategy controller 238 controls the controllable subsystems 172 to nudge the position of grain cart 110 along container 118 to achieve a desired fill level within container 118. Performing the unload operation is indicated by block 334 in the flow diagram of FIG. 6. Having grain cart-specific control system 220 control the gate position and engine speed based upon the commanded unload rate request in the master command is indicated by block 336. Generating other control signals to perform the unload operation is indicated by block 338.

Fill level detector 236 detects the fill level in container 118, as indicated by block 340, and fill strategy controller 238 generates nudge operations to execute a desired fill strategy, as indicated by block 342. Until the unload operation is complete, as determined at block 344 (such as when the fill strategy is complete or the fill level reaches a desired level), processing reverts to block 334 where the unload operation is continued.

Once the unload operation is complete, then master control signal generator 240 issues a master command that commands the grain cart-specific control system 220 to perform a shutdown sequence, as indicated by block 346 in the flow diagram of FIG. 6. In one example, in order to perform the shutdown sequence, gate controller 252 first generates a control signal to control gate actuator 180 to close gate 111, as indicated by block 348 in the flow diagram of FIG. 6. Clean out timer 254 then sets a clean out time so auger 112 continues to run for the clean out time with the gate 111 closed in order to clean out the auger 112. Cleaning out the auger 112 is indicated by block 350. Engine speed controller 246 then generates a control signal to reduce the speed of engine 170, as indicated by block 352, and PTO engagement controller 248 then disengages the power take-off subsystem 262, as indicated by block 354. Engine speed controller 246 then increases the speed of engine 170 back to its prior speed, as indicated by block 356, and auger/spout actuator controller 244 generates control signals to control the auger position actuator 176 and spout position actuator 178 to fold the auger to a desired position, as indicated by block 358 in the flow diagram of FIG. 6, and as is discussed in greater detail below with respect to FIG. 7.

Figure 7A:
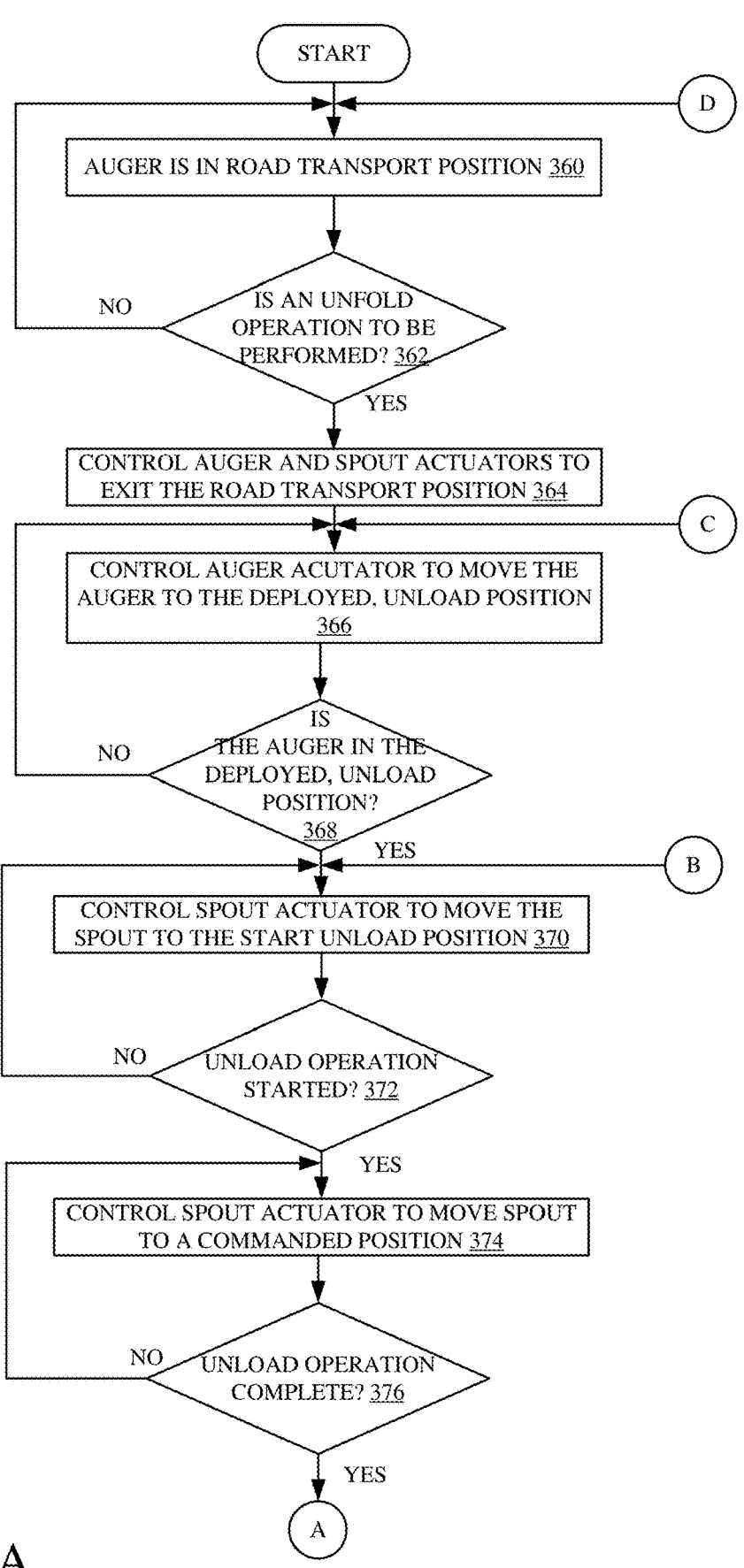
FIGS. 7A and 7B (collectively referred to herein as FIG. 7) are a flow diagram showing one example of the operation of the grain cart-specific control system in controlling an auger and spout of a grain cart illustrated in FIGS. 2A, 2B, and 2C.
Figure 7B:
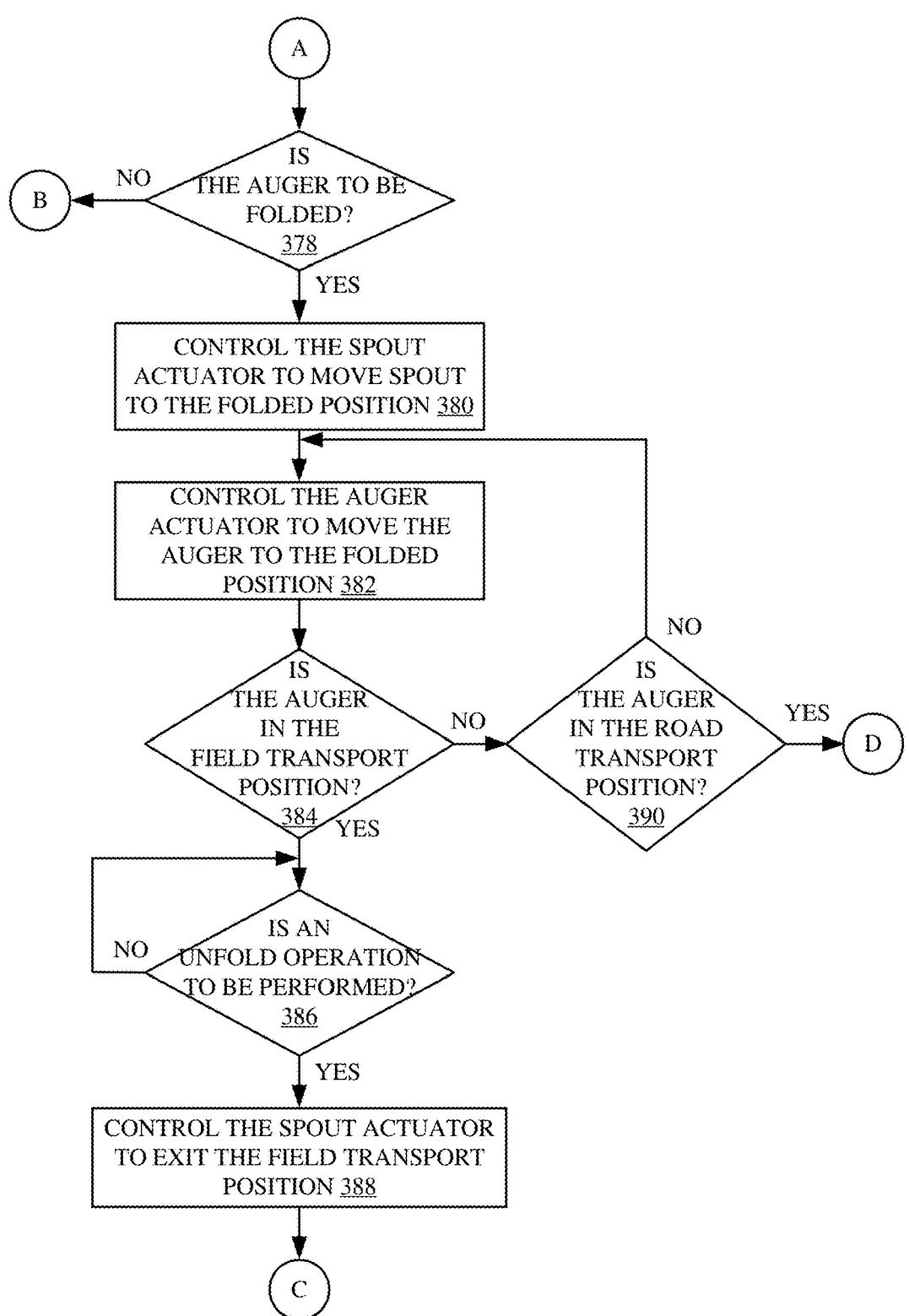

FIGS. 7A and 7B (collectively referred to herein as FIG. 7) show one example of the operation of auger/spout actuator controller 244 in controlling the auger position actuator 176 and spout position actuator 178 to fold and unfold the auger 112 and spout 114, as commanded. It is first assumed that grain cart 110 is a grain cart similar to that shown in FIGS. 2A-2C so that auger 112 and spout 114 can be moved through a plurality of different positions, including the road transport position, the field transport position, and the deployed, unload position. For purposes of the discussion of FIG. 7, it is assumed that auger 112 is initially in the road transport position, as shown in FIG. 2A, and as indicated by block 360 in the flow diagram of FIG. 7. Auger 112 is maintained in the road transport position until an unfold operation is to be performed, such as when an unfold master command is received from master control signal generator 240 of master control system 218. Determining whether an unfold operation is to be performed is indicated by block 362 in the flow diagram of FIG. 7.

Once an unfold operation has been commanded, then auger/spout actuator controller 244 controls the auger position actuator 176 and spout position actuator 178 to exit the road transport position, as indicated by block 364. This may include, for instance, releasing any holding mechanisms that are holding the spout 114 and auger 112 in the road transport position or other operations. Auger/spout actuator controller 244 then generates control signals to control the auger position actuator 176 to move the auger to the deployed, unload position shown in FIG. 2C, as indicated by block 366 in the flow diagram of FIG. 7. Auger/spout actuator controller 244 can use open loop control or determine that auger 112 is in the deployed, unload position based on feedback from auger/spout position sensors 268, or in other ways. Once the auger 112 is in the deployed, unload position as determined at block 368, then auger/spout actuator controller 244 controls the spout position actuator 178 to move the spout to the start unload position, as indicated by block 370. Until the unload operation has started, as determined by block 372, the spout and auger actuators are controlled to maintain the spout 114 and auger 112 in the deployed, unload position. To begin an unload operation, a master command will command the grain cart-specific control system 220 to engage the PTO, open the gate, etc. as discussed above Once an unload operation has started, then fill strategy controller 238 generates a master command indicating when the landing point of material in container 118 should be moved. For instance, once fill level detector 236 determines that the fill level at a current landing point is at a desired level, then the spout 114 may be moved to redirect the trajectory of the material to change the landing point. In that case, a master command will be output to auger/spout actuator controller 244 indicating that the landing point should be changed in a desired way. Auger/spout actuator controller 244 then generates a control signal to control the spout position actuator 178 to move the spout to a position so that the landing point is at a commanded position, as indicated by block 374 in the flow diagram of FIG. 7. At the same time, fill strategy controller 238 will be generating nudge commands to nudge grain cart 110 along the side of the container 118 to load material into container 118 according to a desired fill strategy.

Once the unload operation is complete, as determined at block 376, then auger/spout actuator controller 244 determines whether the auger 112 and spout 114 are to be folded during transport back to the harvester 102. In some examples, it may be that the auger 112 and spout 114 need not be folded, but can remain in the deployed position as grain cart 110 travels back to the harvester 102. In another example, it may be that the auger 112 and spout 114 are to be folded to the field transport position (such as that shown in FIG. 2B) or to another position. Determining whether the auger 112 and spout 114 are to be folded is indicated by block 378 in the flow diagram of FIG. 7. If not, processing reverts to block 370 where the spout actuator is controlled to move the spout 114 back to the start unload position and spout 114 is maintained in that position until another unload operation is started.

However if, at block 378, it is determined that auger 112 and/or spout 114 are to be folded, then auger/spout actuator controller 244 generates control signals to move the spout 114 to the folded position, as indicated by block 380, and auger/spout actuator controller 244 generates control signals to control the auger actuator 176 to move the auger 112 to the folded position, as indicated by block 382. It will be noted that the auger 112 and spout 114 can either be folded to a road transport position or a field transport position (shown in FIGS. 2A and 2B, respectively). If the auger 112 is in the field transport position, as determined by block 384, then the auger 112 and spout 114 are maintained in that position until an unfold operation is to be performed, as determined at block 386. When an unfold operation is to be performed, then auger/spout actuator controller 244 again controls the spout actuator 178 and auger actuator 176 to exit the field transport position, as indicated by block 388, and processing reverts back to block 366 where the auger 112 is moved to the deployed, unload position, as is the spout 114, in preparation for another unload operation.

If, at block 384 it is determined that the auger 112 is not in the field transport position, then it is determined whether the auger 112 is the road transport position, as determined at block 390 in the flow diagram of FIG. 7. Again, the position of the auger can be determined by auger/spout actuator controller 244 based on feedback from auger/spout position sensors 268 or in other ways. If, at block 390, the auger 112 is not in the road transport position (nor is it in the field transport position as determined by block 384), then processing reverts to block 382 where auger/spout actuator controller 244 continues to control the auger position actuator 176 and spout position actuator 178 to move auger 112 and spout 114 to either the field transport position or the road transport position. If, at block 390 it is determined that the auger 112 is in the road transport position, then processing reverts to block 360 in FIG. 7.

It can thus be seen that the present description describes a system in which a master control system can issue the same master commands to control a grain cart-specific control system to perform operations, even though the grain carts themselves vary widely in their functionality and configuration. The master control system need not be redesigned for different grain carts. Instead, the grain cart-specific control system can be configured using a grain cart model or grain cart configuration data to control a specific grain cart or type of grain cart based upon master commands generated by the master control system.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of, the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, sensors, generators, detectors, timers, functionality, and/or logic. It will be appreciated that such systems, components, sensors, generators, detectors, timers, functionality, and/or logic can be comprised of hardware items (such as processors and associated memory, or other processing components, some of which are described below) that perform the functions associated with those systems, components, sensors, generators, detectors, timers, functionality, and/or logic. In addition, the systems, components, sensors, generators, detectors, timers, functionality, and/or logic can be comprised of software that is loaded into a memory and is subsequently executed by a processor or server, or other computing component, as described below. The systems, components, sensors, generators, detectors, timers, functionality, and/or logic can also be comprised of different combinations of hardware, software, firmware, etc., some examples of which are described below. These are only some examples of different structures that can be used to form the systems, components, sensors, generators, detectors, timers, functionality, and/or logic described above. Other structures can be used as well.

Figure 8:
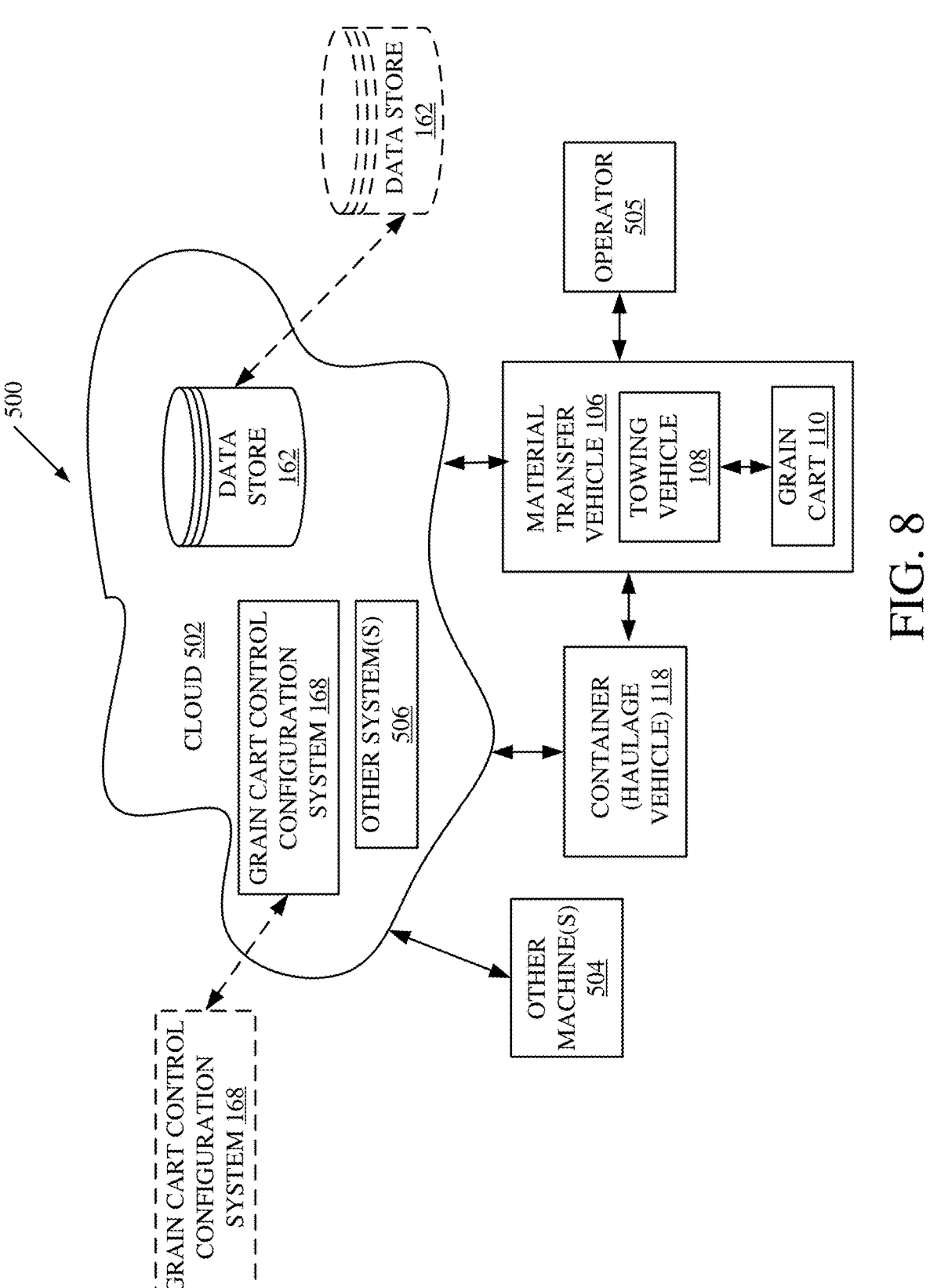
FIG. 8 is a block diagram showing one example of the agricultural system shown in FIG. 1 deployed in a remote server environment.

FIG. 8 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 8, some items are similar to those shown in previous FIGS. and they are similarly numbered. FIG. 8 specifically shows that grain cart control configuration system 168, and data store 162 and/or other systems 506 can be located at a remote server location 502. Therefore, agricultural system 100 accesses those systems through remote server location 502.

FIG. 8 also depicts an operator 505 and another example of a remote server architecture. FIG. 8 shows that it is also contemplated that some elements of previous FIGS. are disposed at remote server location 502 while others are not. By way of example, data store 162 or system 168 can be disposed at a location separate from location 502, and accessed through the remote server at location 502. Regardless of where the items are located, the items can be accessed directly by agricultural system 100, through a network (either a wide area network or a local area network), the items can be hosted at a remote site by a service, or the items can be provided as a service, or accessed by a connection service that resides in a remote location. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
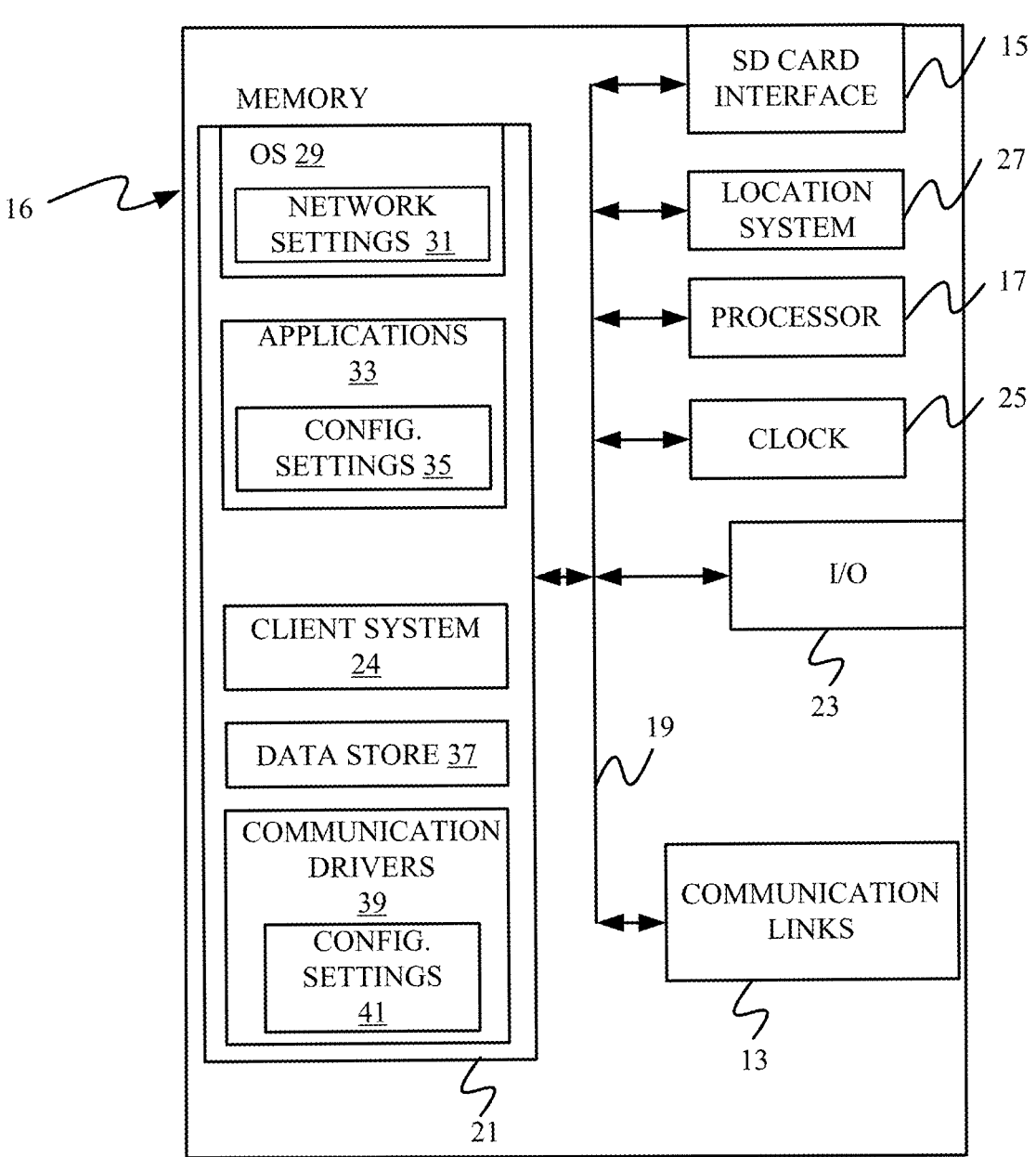
FIGS. 9, 10, and 11 show examples of mobile devices that can be used in the architectures and systems shown in other figures.
Figure 10:
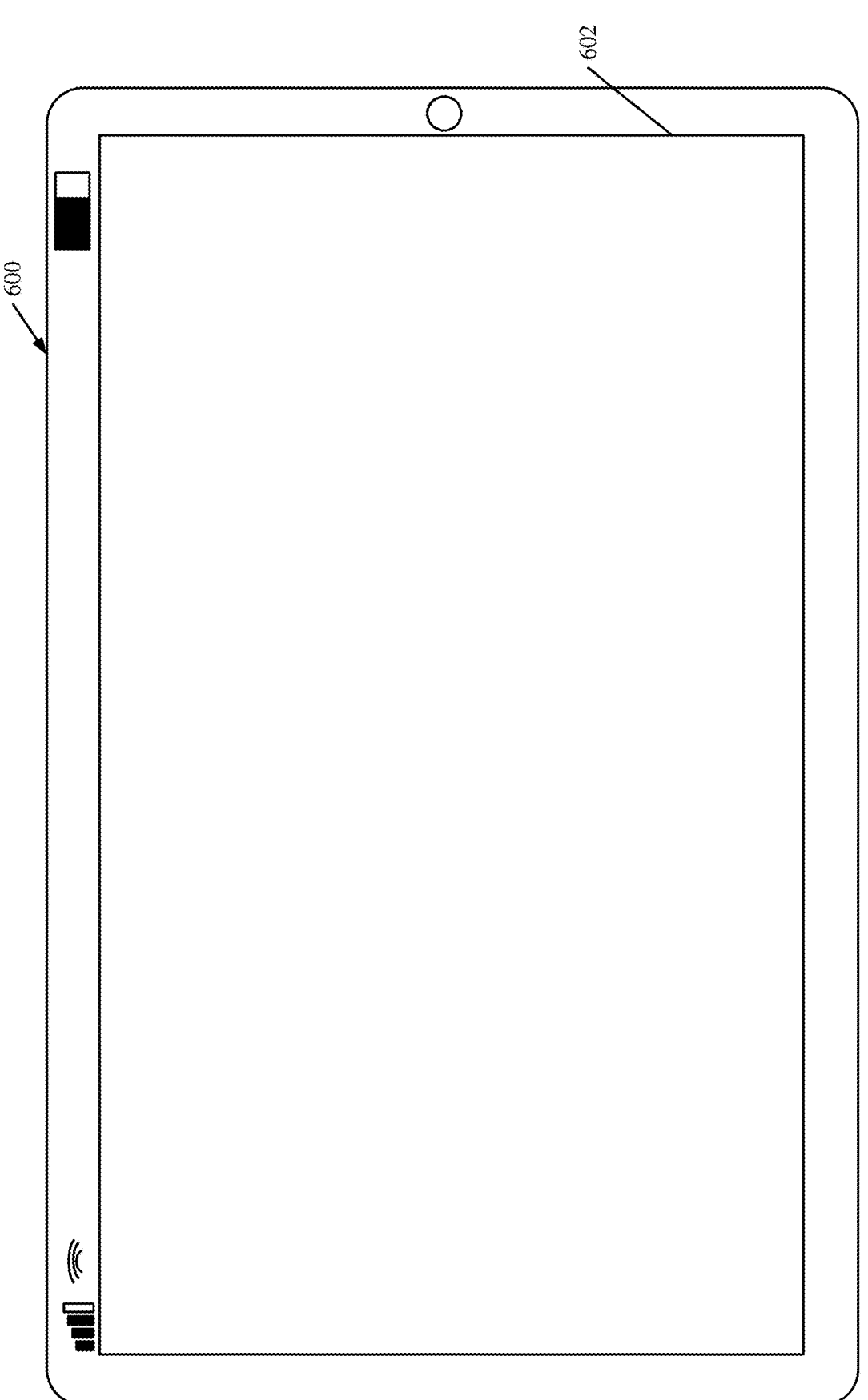
Figure 11:
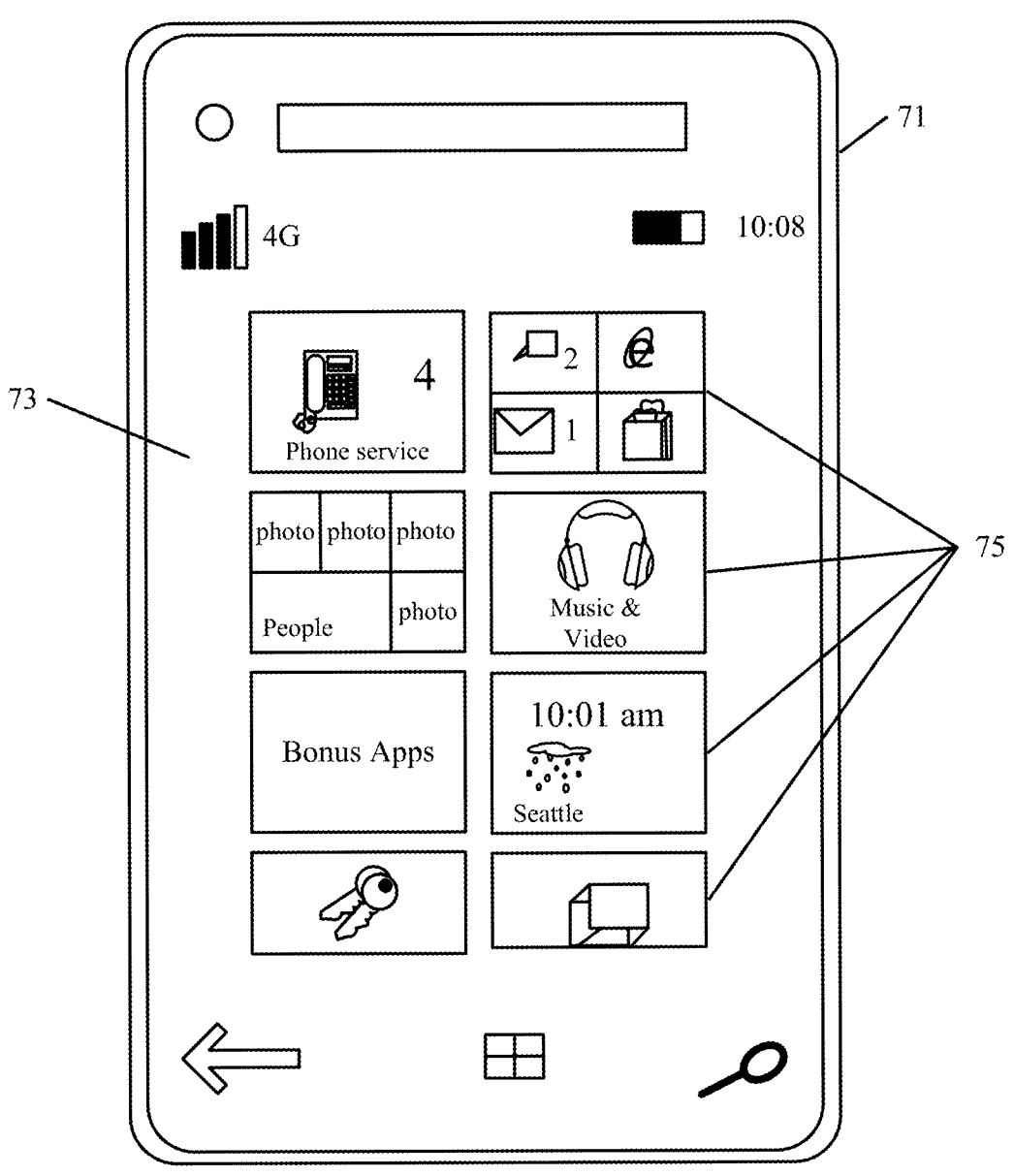

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 and/or towing vehicle 108, for use in generating, processing, or displaying the control and configuration data. FIGS. 10-11 are examples of handheld or mobile devices.

FIG. 9 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. The location system can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
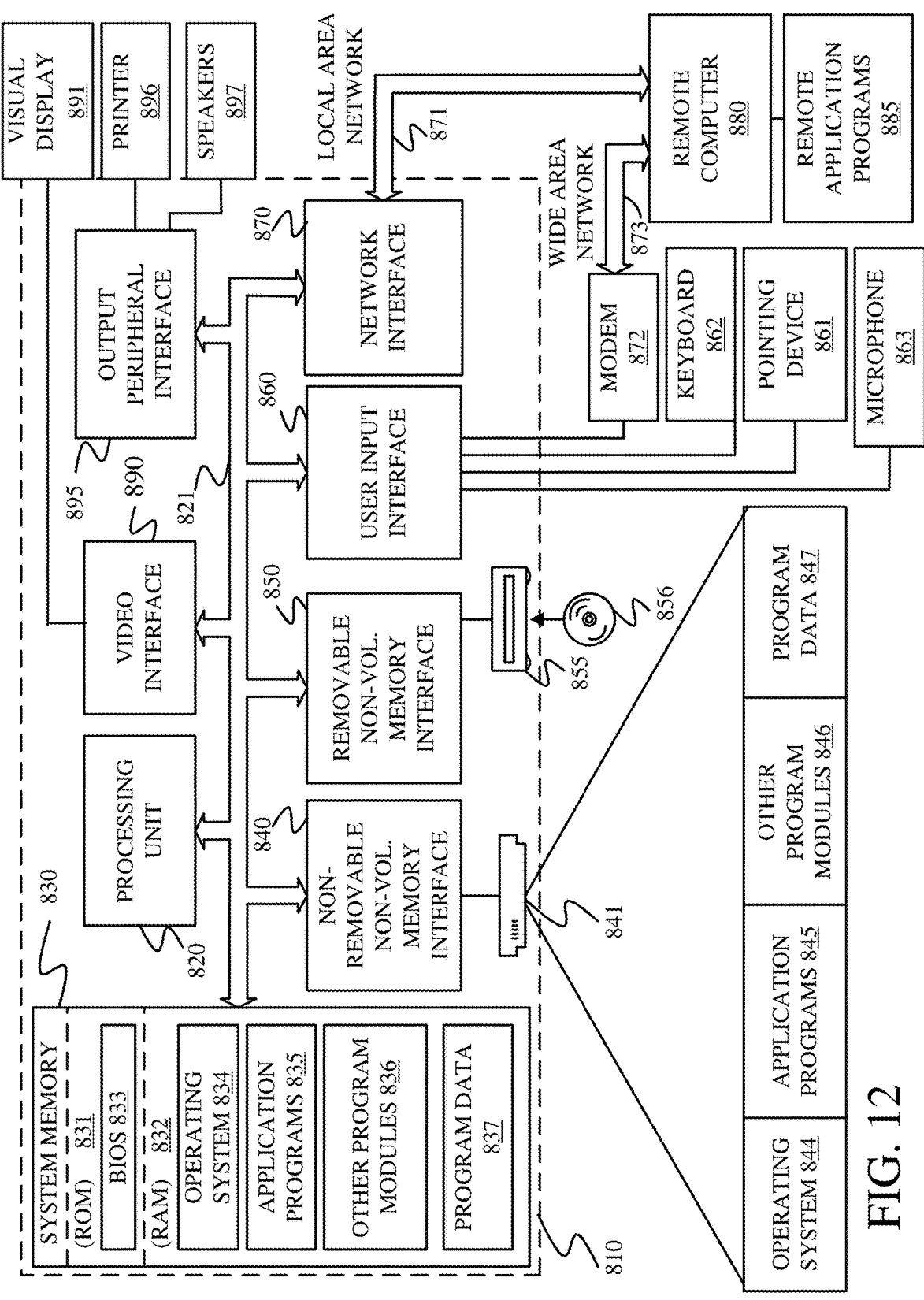
FIG. 12 is a block diagram showing one example of a computing environment that can be used in architectures and systems shown in other figures.

FIG. 12 is one example of a computing environment in which elements of previous FIGS., or parts of it, (for example) can be deployed. With reference to FIG. 12, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling a grain cart pulled by a propulsion vehicle, comprising:
    generating a master command with a master control system on the propulsion vehicle, the master command identifying a grain cart operation to be performed;
    receiving the master command at a grain cart-specific control system on the propulsion vehicle;
    generating, by the grain cart-specific control system on the propulsion vehicle, a set of grain cart-specific commands based on the master command; and
    controlling, with the grain cart-specific control system on the propulsion vehicle, an actuator on the grain cart to execute the set of grain cart-specific commands.

2. The computer implemented method of claim 1 wherein generating the master command with the master control system comprises:
    detecting that the grain cart is in an unloading position relative to a container; and
    generating, as the master command, a power-up command commanding the grain cart-specific control system to perform a power-up sequence, wherein controlling comprises performing the power-up sequence.

3. The computer implemented method of claim 2 wherein performing the power-up sequence comprises:
    controlling actuators on the grain cart to configure the grain cart for unloading material from the grain cart into the container.

4. The computer implemented method of claim 3 wherein the propulsion vehicle has an engine, and the grain cart has an unloading auger and further comprising:
    after the auger is in a deployed position to perform an unloading operation, generating an engine slow signal to slow a speed of the engine to a first speed;
    generating an engage pto signal to engage a power takeoff; and
    generating an engine fast signal to control the speed of the engine to a second speed, faster than the first speed.

5. The computer implemented method of claim 4 wherein the grain cart has a gate that opens to allow material to flow to the auger and wherein controlling actuators on the grain cart to configure the grain cart for unloading material from the grain cart into the container comprises:
    controlling a gate actuator to move the gate into an open position.

6. The computer implemented method of claim 5 wherein generating a master command comprises generating an unload rate request indicative of a requested rate at which material is unloaded from the grain cart to the container, wherein controlling, with the grain cart-specific control system, comprises:
    controlling a position of the gate based on the unload rate request.

7. The computer implemented method of claim 6 wherein generating a master command comprises generating an auger unfold command and wherein controlling, with the grain cart-specific control system, comprises:
    controlling an auger position actuator to move the auger to the deployed position based on the auger unfold command.

8. The computer implemented method of claim 7 wherein the grain cart includes a spout and a spout position actuator that positions the spout and wherein controlling, with the grain cart-specific control system, comprises:
    generating a spout position control signal to control the spout position actuator to move the spout into the deployed position based on the auger unfold command.

9. The computer implemented method of claim 5 wherein generating the master command comprises:
    detecting that an unloading operation is complete; and
    generating, as the master command, a command for the grain cart-specific control system, to perform a power down sequence and further comprising controlling the grain cart to perform the power down sequence.

10. The computer implemented method of claim 9 wherein controlling comprises:
    generating a gate close signal to control the gate actuator to move the gate to a closed position;
    controlling the auger to run for a clean out time period;
    generating an engine slow signal to slow a speed of the engine to the first speed;
    generating a disengage pto signal to disengage the power takeoff; and
    generating an engine fast signal to control the speed of the engine to the second speed, faster than the first speed.

11. The computer implemented method of claim 10 wherein generating a master command comprises generating an auger fold command and wherein generating a control signal with the grain cart-specific control system comprises:
    controlling an auger position actuator to move the auger to a folded position based on the auger fold command.

12. The computer implemented method of claim 1 and further comprising:
    accessing grain cart-specific configuration values; and
    configuring the grain cart-specific control system, based on the grain cart-specific configuration values, to generate the grain cart-specific commands.

13. The computer implemented method of claim 12 wherein accessing grain cart-specific configuration values comprises:
    detecting a grain cart identifier identifying the grain cart; and
    downloading a grain cart model based on the grain cart identifier.

14. The computer implemented method of claim 12 wherein accessing grain cart-specific configuration values comprises:
    conducting a configuration user experience to receive user configuration inputs indicative of a configuration of the grain cart.

15. The computer implemented method of claim 14 wherein conducting a configuration user experience to receive user configuration inputs comprises:

generating an interactive display;

prompting, on the interactive display, user manipulation of an actuator on the grain cart;

detecting configuration information based on the user manipulation of the actuator on the grain cart; and saving the configuration information corresponding to a grain cart identifier identifying the grain cart.

16. A control system on a propulsion vehicle for controlling a grain cart propelled by the propulsion vehicle, the control system comprising:

a master control system, on the propulsion vehicle, configured to generate a grain cart independent master command identifying a grain cart operation to be performed;

a grain cart-specific control system, on the propulsion vehicle, configured to:

receive the master command;

generate a set of grain cart-specific commands based on the master command; and control an actuator on the grain cart to execute the set of grain cart-specific commands; and a grain cart control configuration system configured to access grain cart-specific configuration values and configure the grain cart-specific control system, based on the grain cart-specific configuration values, to generate the grain cart-specific commands.

17. The control system of claim 16 wherein the master control system comprises:

a vehicle position control system configured to detect that the grain cart is in an unloading position relative to a container;

an unload operation control system configured to generate, as the master command, a power-up command commanding the grain cart-specific control system to perform a power-up sequence.

18. The control system of claim 17 wherein the grain cart includes a gate and a gate actuator and further comprising an unload rate request generator configured to generate an unload rate request indicative of a requested rate at which material is unloaded from the grain cart to the container and wherein the grain cart-specific control system comprises:

a gate controller configured to generate a gate actuator control signal to control the gate actuator to control a position of the gate based on the unload rate request.

19. The control system of claim 16 wherein the master control system comprises:

a fill strategy controller configured to detect when an unloading operation is complete; and an unload operation control system configured to generate, as the master command, a power down command commanding the grain cart-specific control system to perform a power down sequence.

20. A propulsion vehicle that propels a grain cart, comprising:

an engine;

a propulsion subsystem;

a steering subsystem;

a master control system configured to generate a master command, the master command identifying a grain cart operation to be performed;

a grain cart-specific control system configured to receive the master command and generate a set of grain cart-specific commands based the master command; and a controller configured to generate a control signal to control an actuator on the grain cart to execute the set of grain cart-specific commands.

* * * * *